US008276961B2

(12) United States Patent
Kwolek

(10) Patent No.: US 8,276,961 B2
(45) Date of Patent: Oct. 2, 2012

(54) VEHICLE TRIM ASSEMBLY

(75) Inventor: Chad Kwolek, Hartland, MI (US)

(73) Assignee: Nissan North America, Inc., Franklin, TN (US)

(*) Notice: Subject to any disclaimer, the term of this patent is extended or adjusted under 35 U.S.C. 154(b) by 148 days.

(21) Appl. No.: 13/014,364

(22) Filed: Jan. 26, 2011

(65) Prior Publication Data
US 2012/0187707 A1 Jul. 26, 2012

(51) Int. Cl.
B62D 39/00 (2006.01)
(52) U.S. Cl. .......................... 296/1.08; 24/289
(58) Field of Classification Search ................ 296/1.08; 24/289, 293, 294
See application file for complete search history.

(56) References Cited

U.S. PATENT DOCUMENTS

| 1,782,695 | A | * | 11/1930 | Prez | 52/511 |
| 2,216,219 | A | * | 10/1940 | Wiley | 24/293 |
| 2,275,127 | A | * | 3/1942 | Brown | 52/718.06 |
| 2,362,909 | A | * | 11/1944 | Lind et al. | 29/505 |
| 2,500,297 | A | * | 3/1950 | Schunk | 49/493.1 |
| 4,887,861 | A |   | 12/1989 | Moch et al. | |
| 7,766,377 | B2 |  | 8/2010 | Downey et al. | |
| 2010/0219653 | A1 |  | 9/2010 | Kwolek | |

FOREIGN PATENT DOCUMENTS

JP 58-194641 A 11/1983

* cited by examiner

Primary Examiner — Lori Lyjak
(74) Attorney, Agent, or Firm — Global IP Counselors, LLP

(57) ABSTRACT

A vehicle trim panel includes a mounting structure fixed to a base surface. The mounting structure includes a first and second support portions spaced apart from one another, both extending from the base surface. The first and second support portions have respective first ends fixedly attached to the base surface and respective second ends distal from their respective first ends. The first support portion and the second support portion are bridged by a guide portion that extends between the second ends of the first and second support portions. The guide portion defines a guide surface that extends in a direction that is non-orthogonal relative to a plane defined by an adjacent section of the base surface. The guide portion, the first support portion, the second support portion and the adjacent section of the base surface define an insertion aperture with a central axis that extends parallel to the plane.

20 Claims, 21 Drawing Sheets

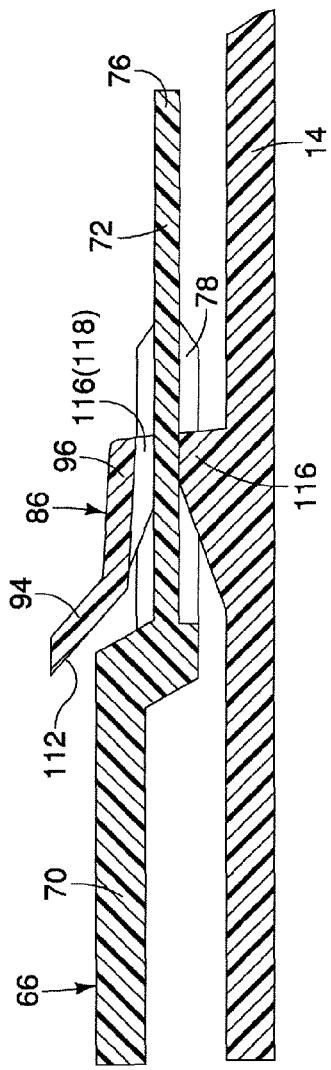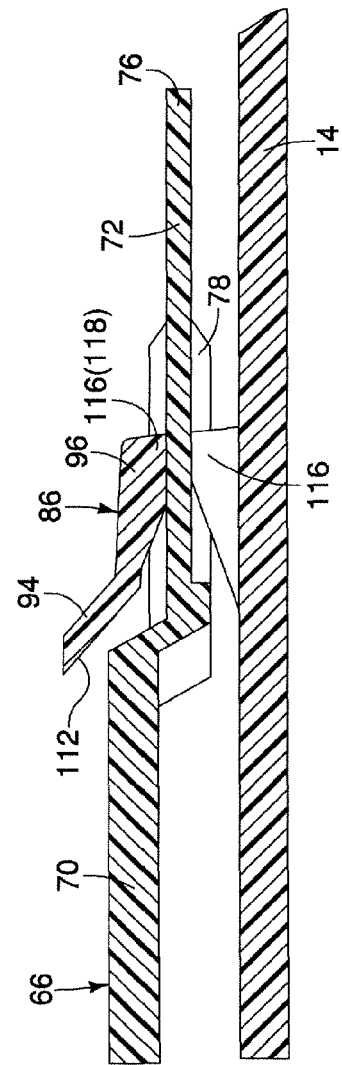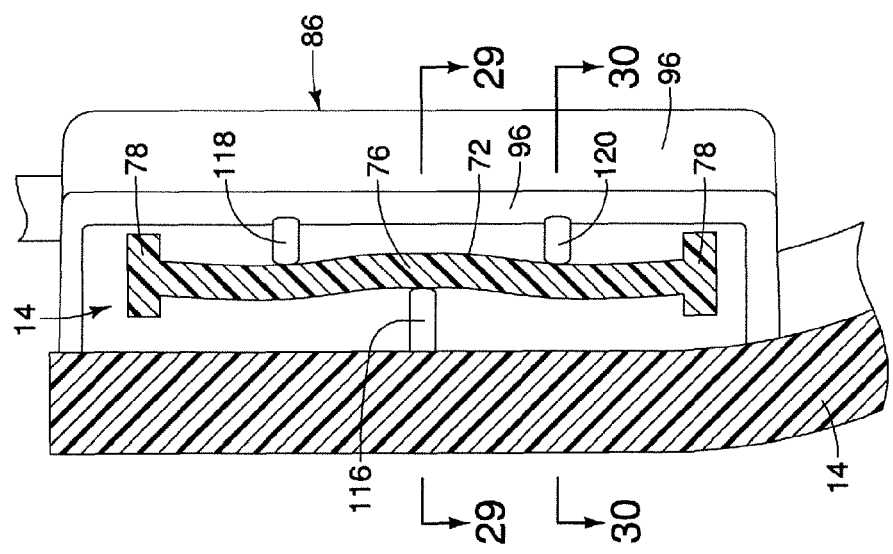

VEHICLE TRIM ASSEMBLY

BACKGROUND

1. Field of the Invention

The present invention generally relates to a vehicle trim assembly. More specifically, the present invention relates to a vehicle trim assembly that includes trim panels having features that aid in blind installation of the trim panels.

2. Background Information

In recent years, vehicles have been designed with interior trim assemblies that are fitted together with interlocking fastening elements. For example, a first trim element can include apertures formed along an edge thereof. A second trim element can include projections that are pressed into the apertures such that the projection retains the second trim element in place relative to the first trim element. Often, during installation of the first and second trim elements, the projections and/or the apertures are concealed behind the trim elements themselves. Such an arrangement is typically referred to as a blind installation because the installer cannot see the projections and/or the apertures.

SUMMARY

One object of the present invention is to simplify blind installation of trim panels to other trim elements.

In view of the state of the known technology, one aspect of the present invention includes a vehicle trim panel with a main body and a mounting structure. The main body includes a trim surface, a base surface and a peripheral edge. The mounting structure is fixed to the base surface. The peripheral edge extends between the trim surface and the base surface. The mounting structure includes a first support portion and a second support portion spaced apart from one another. The first support portion and the second support portion both extend from the base surface. The first and second support portions have respective first ends fixedly attached to the base surface and the first and second support portions have respective second ends distal from the respective first ends. The first support portion and the second support portion are bridged by a guide portion that extends between the second ends of the first and second support portions. At least a section of the guide portion defines a guide surface that extends away from the base surface in a direction that is non-orthogonal relative to a plane defined by an adjacent section of the base surface. The guide portion, the first support portion, the second support portion and the adjacent section of the base surface define an insertion aperture with a central axis that extends parallel to the plane.

BRIEF DESCRIPTION OF THE DRAWINGS

Referring now to the attached drawings which form a part of this original disclosure:

FIG. 28 is a cross-sectional view of the projection and the mounting structure of the trim panel taken along the line 28-28 in FIG. 27, showing the projection deflecting in response to contact with the deflection ribs within the mounting structure in accordance with the first embodiment;

FIG. 29 is a cross-sectional view of the projection and the mounting structure of the trim panel taken along the line 29-29 in FIG. 28, showing the projection contacting the deflection ribs within the mounting structure in accordance with the first embodiment; and FIG. 30 is another cross-sectional view of the projection and the mounting structure of the trim panel taken along the line 30-30 in FIG. 28 in accordance with the first embodiment.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
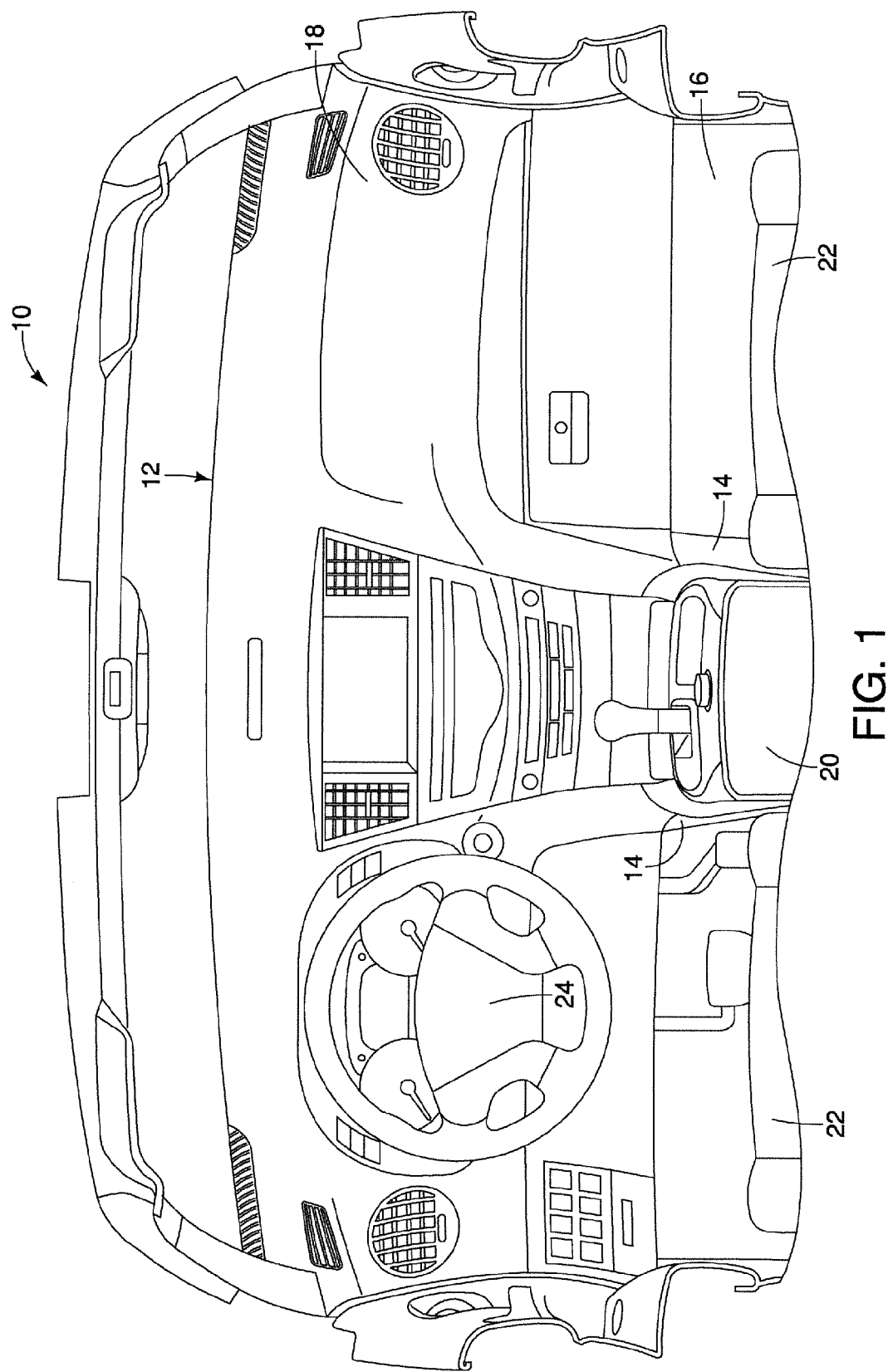
FIG. 1 is a perspective view of a vehicle trim assembly within a passenger compartment of a vehicle showing seats, a steering column, a dashboard, a center console and trim panels, the trim panels being installed to elements under the dashboard and the center console in accordance with a first embodiment.

Referring initially to FIG. 1, a portion of a vehicle 10 that includes a vehicle trim assembly 12 with a pair of trim panels 14 is illustrated in accordance with a first embodiment. At least one of the trim panels 14 can be configured for a "blind installation", as is described in greater detail below.

The vehicle 10 includes a passenger compartment with a floor 16. The vehicle trim assembly 12 is located within the passenger compartment with portions installed to the floor 16, as described below. The vehicle trim assembly 12 basically includes a dashboard 18, elements beneath the dashboard 18 (described below), a center console 20 that extends between front seats 22 and the trim panels 14. Also disposed within the passenger compartment is a steering column assembly 24 that extends through an aperture in a lower left side section of the dashboard 18. It should be understood from the drawings and the description herein that the dashboard 18, the center console 20, the front seats 22 and the steering column assembly 24 are all installed within the passenger compartment of the vehicle 10. However, since many of the basic elements of the passenger compartment are a conventional features of the vehicle 10, further description of the passenger compartment is omitted for the sake of brevity, except where necessary for a complete understanding of the vehicle trim assembly 12.

Figure 2:
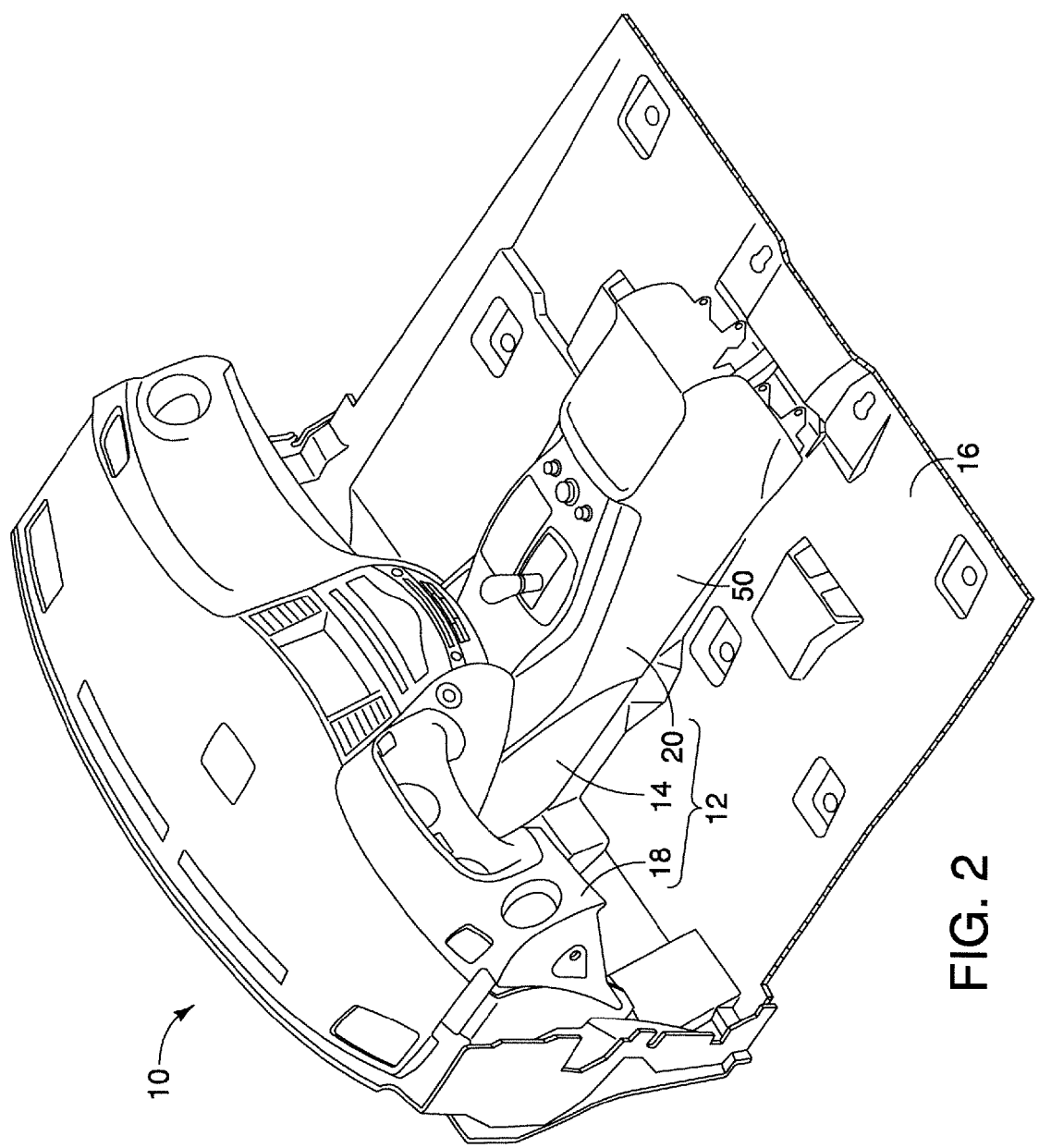
FIG. 2 is another perspective view of a portion of the passenger compartment having the trim assembly with various elements such as the seats and the steering column removed to show features of the floor, the dashboard, the center console and one of the trim panels in accordance with the first embodiment.

FIG. 2 shows a forward portion of the passenger compartment of the vehicle 10 with the seats 22, the steering column 24 and floor coverings (such as floor mats and/or body fastening structures) removed to more clearly show the floor 16, and show the basic features of the vehicle trim assembly 12. Specifically, the dashboard 18, the center console 20 and one of the trim panels 14 at least partially define the vehicle trim assembly 12.

For the sake of appearance, reliability and stability, it is important that the various elements of the vehicle trim assembly 12 fit together snugly. As is explained in greater detail below, it is also important that certain portions of the vehicle trim assembly 12, such as the trim panels 14, install in such a way as to snugly interconnect with spaced apart adjacent components where the adjacent components are not directly connected to one another. Due to conventional manufacturing tolerances, the actual distance between spaced apart adjacent components may vary from vehicle to vehicle. Therefore, it is important for elements of the vehicle trim assembly 12, such as the trim panels 14, to install with final installation positioning flexibility, as is described in greater detail below.

Figure 3:
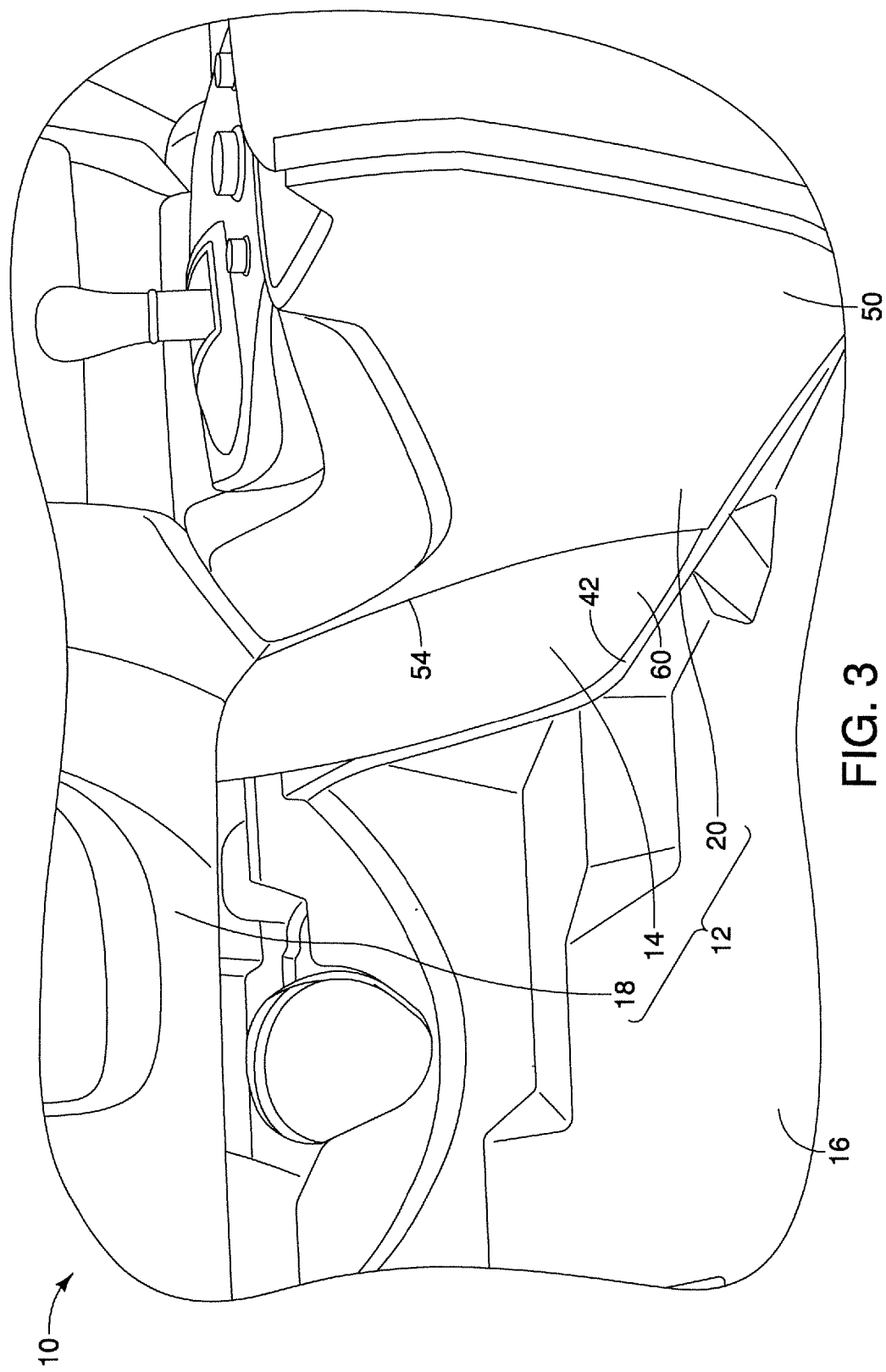
FIG. 3 is another perspective view of a portion of the trim assembly within the passenger compartment below the dashboard, showing a lower edge of the dashboard, a portion of the floor of the passenger compartment, the center console and the trim panel in accordance with the first embodiment.

FIG. 3 shows the vehicle trim assembly 12 with a focus on one of the trim panels 14. Specifically, the trim panel 14 is disposed at a forward end of the center console 20, and extends beneath a section of the dashboard 18. It should be understood that a particular vehicle assembly will typically include two trim panels 14, one on each side of the center console 20. Therefore, the trim panels 14 can be designed such that they are mirror images of one another, but otherwise are identical having the same features being symmetrically positioned with respect to one another. Therefore, description of one trim panel 14 applies to both trim panels 14. Of course, the above mentioned design features can alternatively apply to only one trim panel of a particular vehicle trim assembly as needed and/or desired. Before providing a description of the trim panels 14, a description of features of the vehicle 10, the dashboard 18 and the center console 20 are first provided to present a more complete understanding of the vehicle trim assembly 12.

Figure 4:
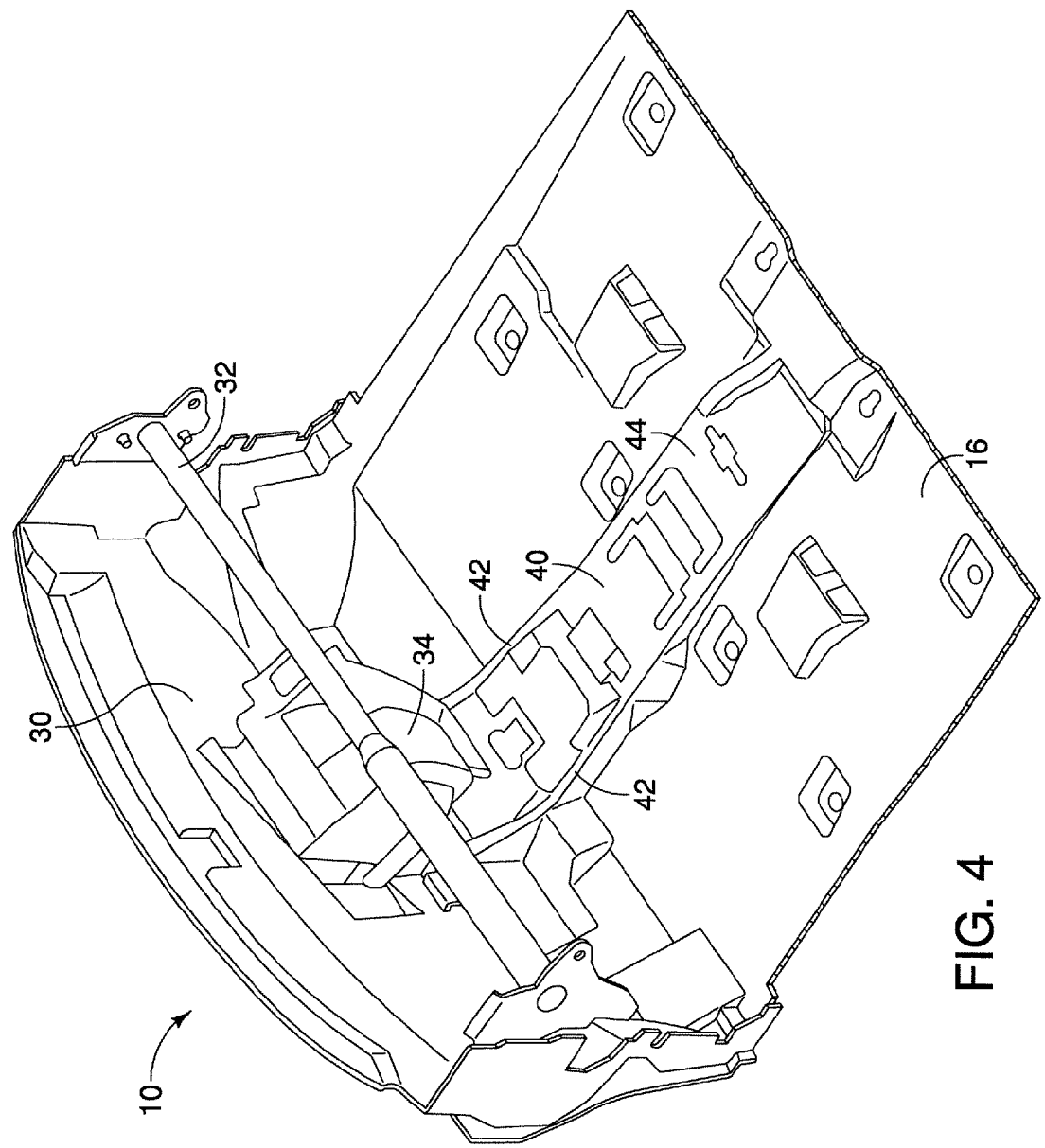
FIG. 4 is another perspective view of the portion of the passenger compartment similar to FIG. 2 in an early stage of assembly, with elements that make up the trim assembly, such as the dashboard, center console and trim panels not yet installed showing features of the floor, a dash wall, a cross-member and an HVAC housing in accordance with the first embodiment.

As indicated in FIG. 4, the vehicle 10 includes various structural features that in part define the passenger compartment. For example, the vehicle 10 includes a dash wall 30, a cross-member 32 and the floor 16. It should be understood that the dashboard 18 and the center console 20 are removed in FIG. 4 to better illustrate details of the floor 16, the dash wall 30 and the cross-member 32.

As shown in FIG. 4, the dash wall 30 extends laterally side to side across the vehicle 10 separating the passenger compartment from an engine compartment (not shown) in a conventional manner. The cross-member 32 extends from opposite lateral sides (not shown) of the vehicle 10 in a conventional manner. The cross-member 32 can be a structural element of the vehicle 10 and can also serve as an element that supports the dashboard 18, and other elements disposed beneath the dashboard 18. For example, an HVAC housing 34 (Heating, Ventilation and Air Conditioning housing) can be supported beneath the dashboard 18 by mounting directly or indirectly to the dash wall 30, the dashboard 18 or the cross-member 32. The HVAC housing 34 in the depicted embodiment is shown in engagement with the dash wall 30, but the HVAC housing 34 will typically also be connected to and/or supported by the cross-member 32. A more detailed description of the HVAC housing 34 is provided below. Since the dash wall 30 and the cross-member 32 are conventional elements of the vehicle 10, further description of the dash wall 30 and the cross-member 32 is omitted for the sake of brevity.

Figure 5:
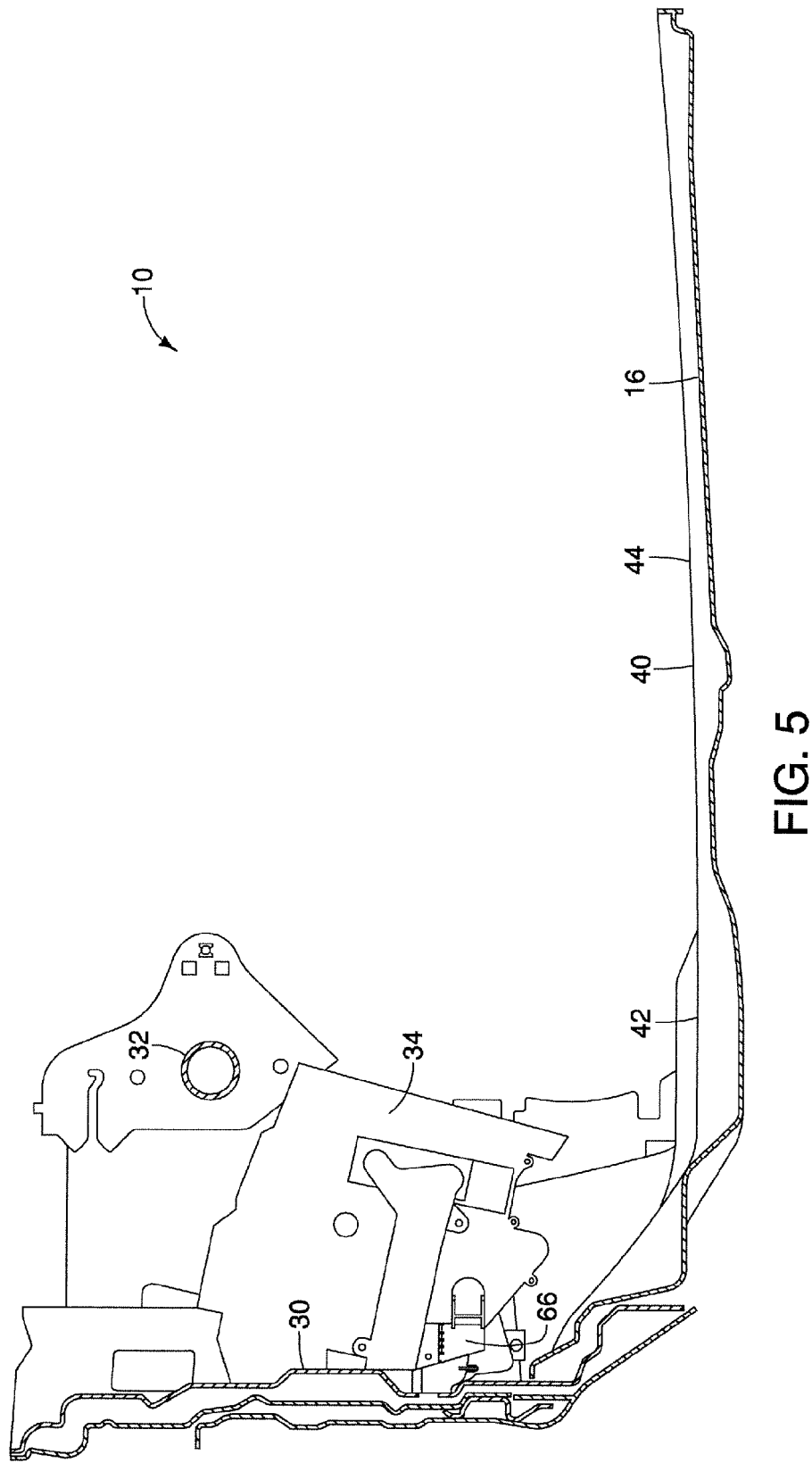
FIG. 5 is a cross-sectional side view of the passenger compartment of the vehicle in the early stage of assembly depicted in FIG. 4, showing the floor, the dash wall, the cross-member and the HVAC housing in accordance with the first embodiment.
Figure 6:
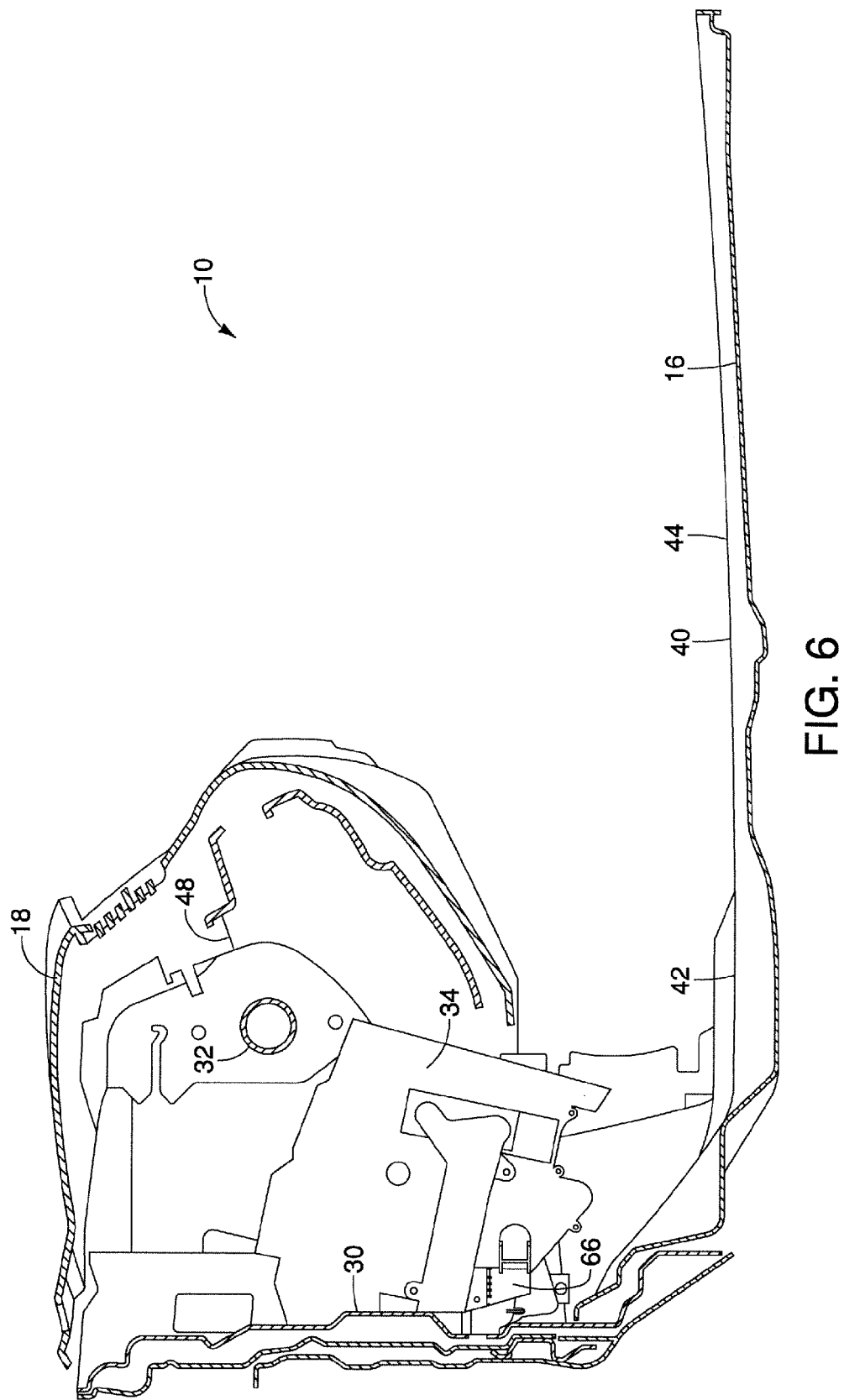
FIG. 6 is another cross-sectional side view of the passenger compartment of the vehicle similar to FIG. 5, in a subsequent stage of assembly showing the dashboard installed to the dash wall and the cross-member and at least partially concealing the HVAC housing, the HVAC housing including a bracket with a projection in accordance with the first embodiment.
Figure 7:
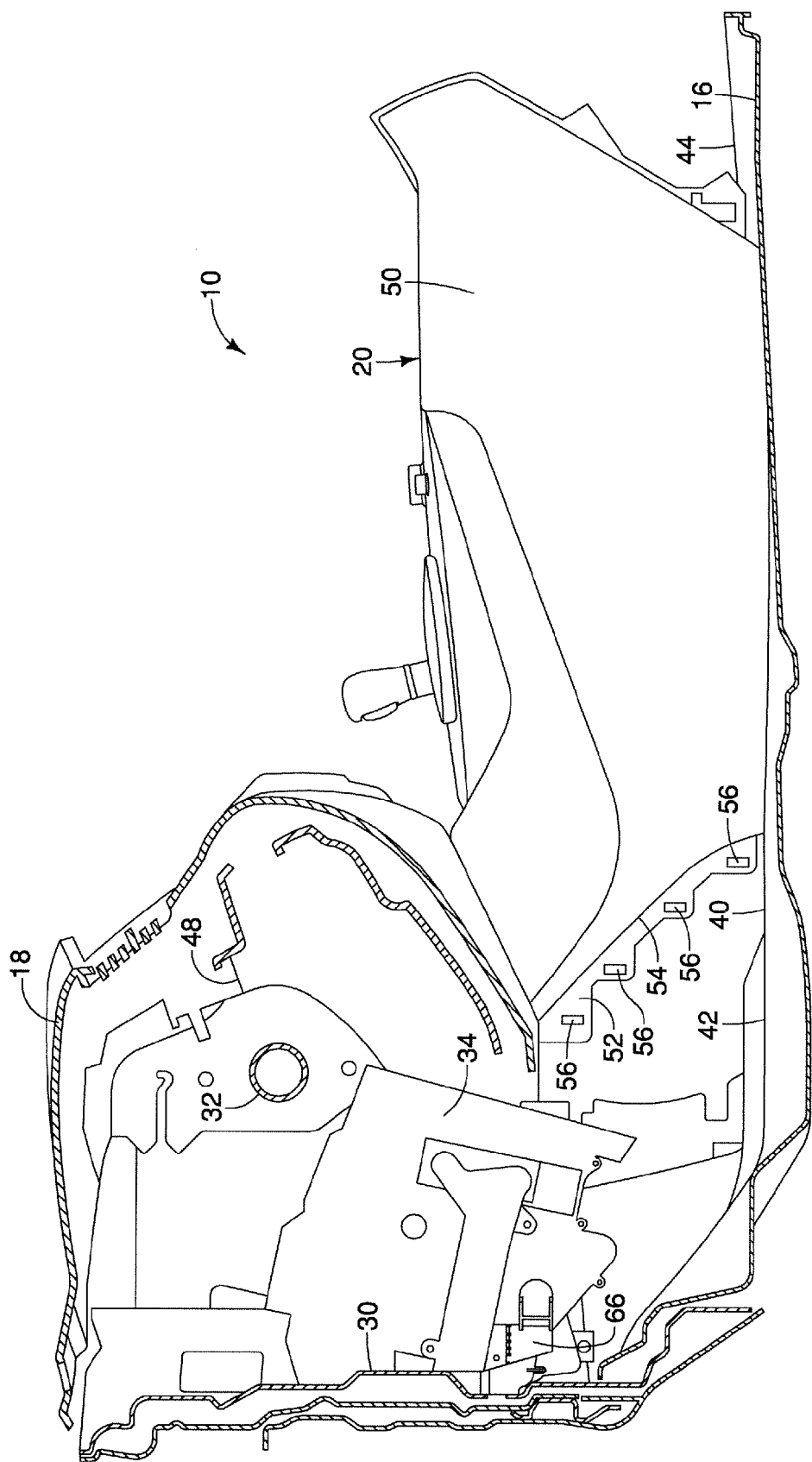
FIG. 7 is another cross-sectional side view of the passenger compartment of the vehicle similar to FIGS. 5 and 6 in yet another subsequent stage of assembly, showing the center console installed to the floor and extending at least partially beneath the dashboard rearward of the HVAC housing, the center console including a plurality of apertures in accordance with the first embodiment.
Figure 8:
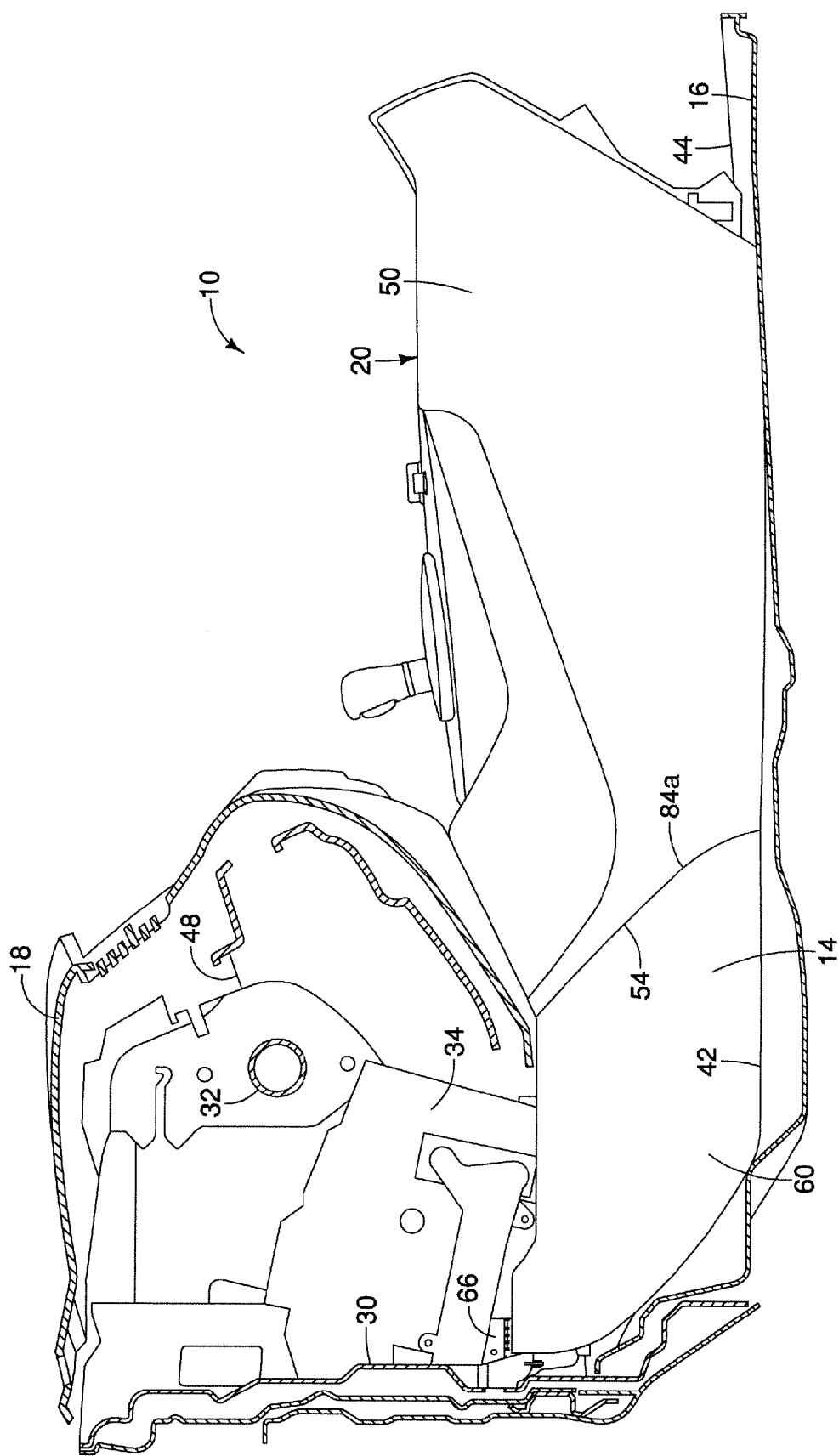
FIG. 8 is another cross-sectional side view of the passenger compartment of the vehicle similar to FIGS. 5, 6 and 7 in still another subsequent stage of assembly, showing one of the trim panels installed to the projection of the bracket of the HVAC housing and the apertures of the center console concealing both the projection and the apertures in accordance with the first embodiment.
Figure 9:
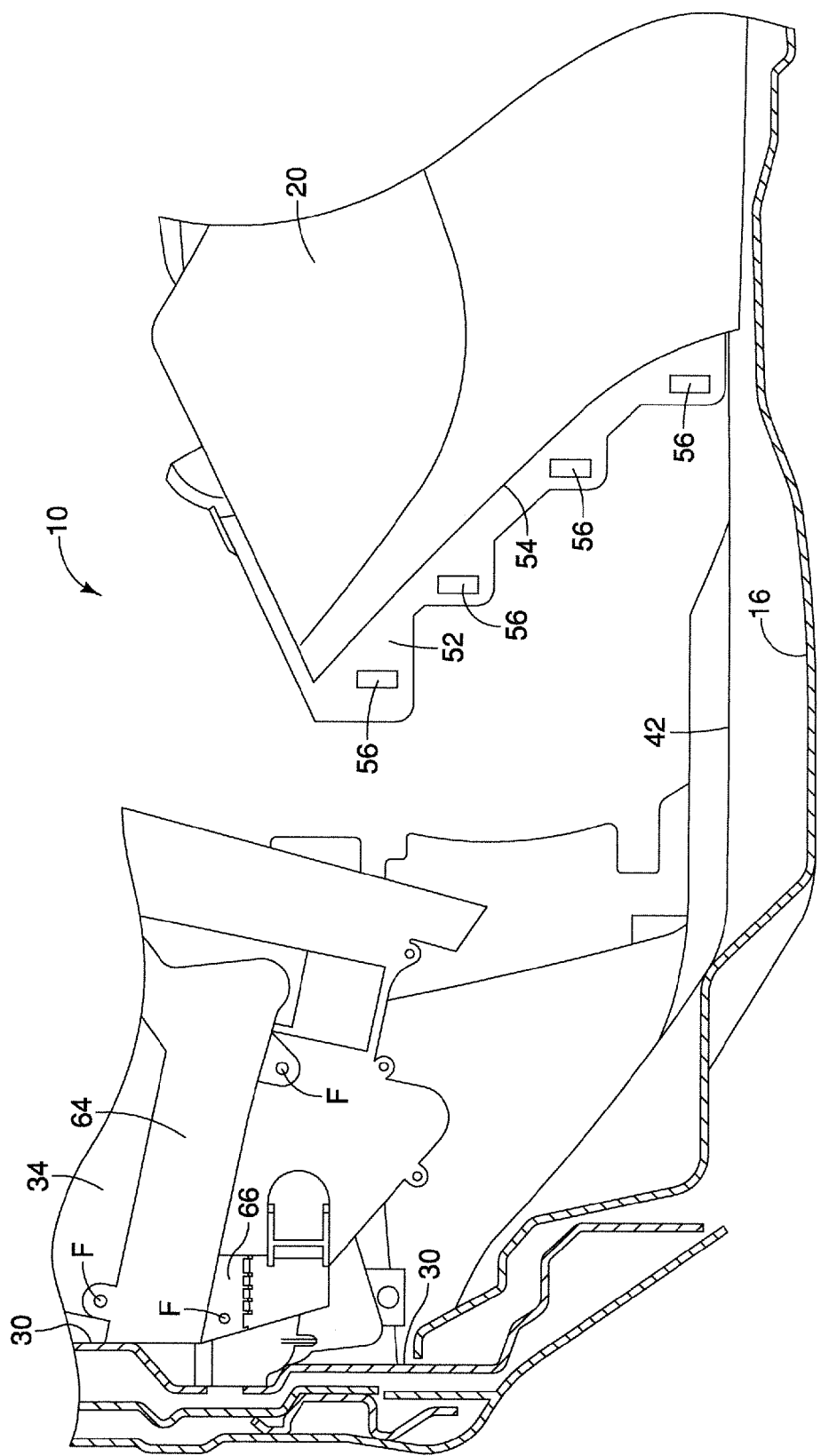
FIG. 9 is an enlarged cross-sectional side view of the passenger compartment, similar to FIG. 7 prior to installation of the trim panel, showing details of the apertures in the center console and the projection of the HVAC housing in accordance with the first embodiment.

With the center console 20 removed in FIGS. 4, 5 and 6, a center section 40 of the floor 16 is visible. The center section 40 is a raised area of the floor 16 that includes various surface features for accommodating and mounting the center console 20. For example, the center section 40 includes forward surface sections 42 on either side of a forward region of the center section 40 and a main surface section 44 that extends rearward from the forward surface sections 42. As shown in FIGS. 7, 8 and 9, the center console 20 is mounted to the main surface section 44 and extends forward to an area just rearward of the forward surface section 42 of the floor 16.

As best indicated in FIGS. 6 and 7, the dashboard 18 is rigidly installed to the dash wall 30 and the cross-member 32 in a conventional manner. The dashboard 18 includes a plurality of conventional attachment points, such as the bracket 48. It should be understood from the drawings and the description herein that various other attachment points are provided between the dashboard 18, the dash wall 30 and the cross-member 32. However since these attachment points are conventional, further description is omitted for the sake of brevity.

As shown in FIG. 7, the center console 20 is installed to the floor 16 covering the majority or all of the main surface section 44 of the floor 16. However, the forward surface section 42 of the floor 16 is not covered by the center console 20. A forward portion of the center console 20 extends under a central section of the dashboard 18, as shown in FIG. 7. The forward portion of the center console 20 and the central section of the dashboard 18 can abut one another or be slightly spaced apart, depending upon vehicle design parameters and tolerances. It should be understood from the drawings and the description herein that the dashboard 18 and the center console 20 are separate elements of the vehicle trim assembly 12 that may vary in relative location from vehicle to vehicle due to conventional manufacturing tolerances. In other words, the exact distance between, for example, the dash wall 30 and the center console 20 can vary slightly from vehicle to vehicle. As is described below, the trim panel 14 installs to the center console 20 with little or no variation in relative positioning being possible. Therefore, attachment of the trim panel 14 to other portions of the vehicle trim assembly 12 requires some flexibility in order to take into account the above mentioned manufacturing tolerances. In other words, the subsequent attachment of the trim panel 14 is such that the final positioning of the trim panel 14 relative to the dash wall 30 or components such as the HVAC housing 34 (which engages the dash wall 30) involves some positioning flexibility, as described below.

The center console includes an outer trim surface 50, a forward lip 52 and edge 54 formed along the forward lip 52, adjacent to the outer trim surface 50. The forward lip 52 is offset or recessed inward from the outer trim surface 50 such that with the trim panel 14 installed, an exposed trim surface 60 of the trim panel 14 is flush with the outer trim surface 50, as indicated in FIGS. 2 and 3. The forward lip 52 extends from an upper forward corner of the center console 20 downward, and rearward with a slight incline, as shown in FIGS. 7 and 9. As is also shown in FIGS. 7 and 9, the forward lip 52 includes a plurality of apertures 56.

As shown in FIG. 8, with the trim panel 14 installed to the center console 20, the forward lip 52, the apertures 56 and a lower portion of the HVAC housing 34 are concealed.

Figure 10:
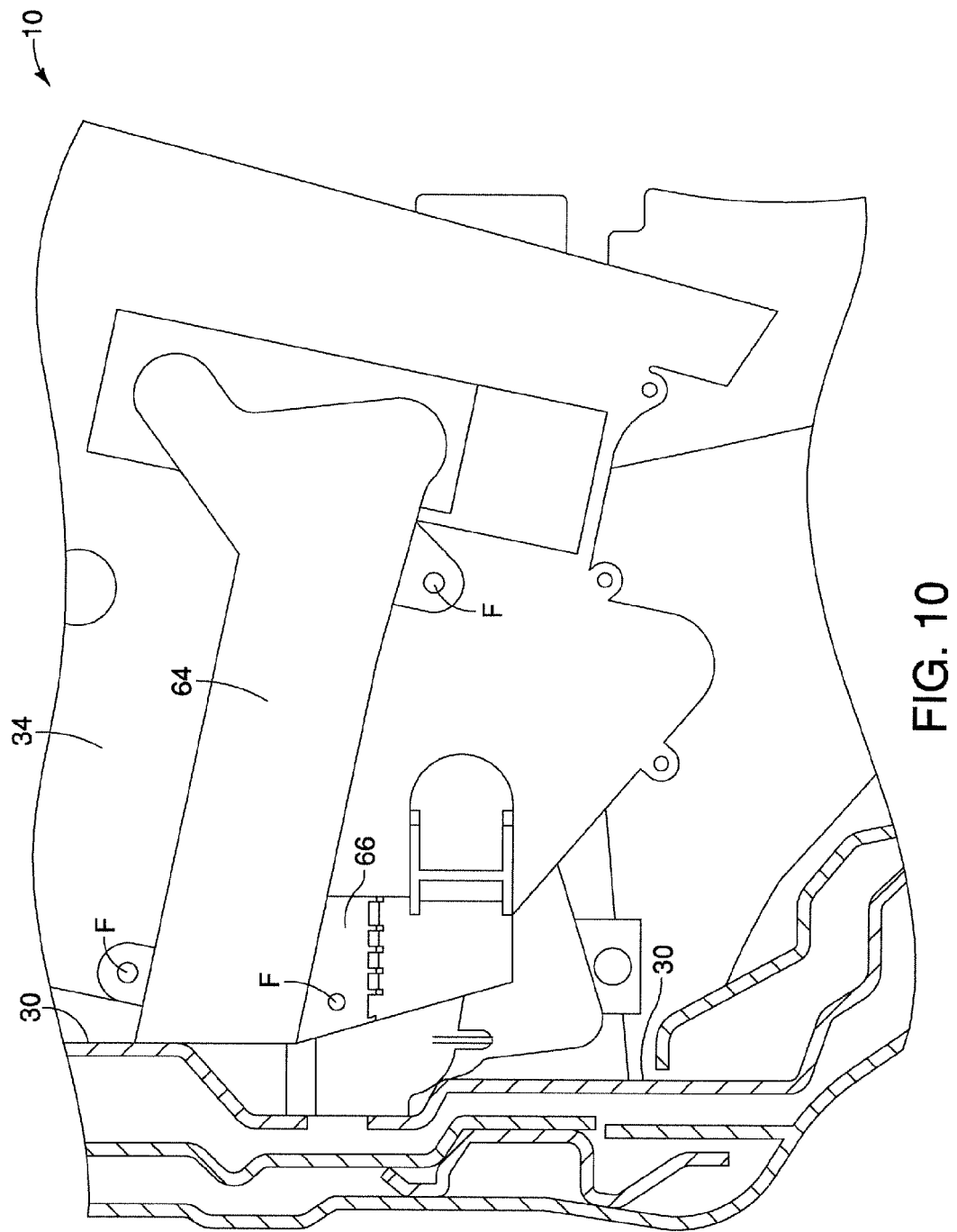
FIG. 10 is a further enlargement of the cross-sectional side view of the portion of the passenger compartment depicted in FIGS. 7 and 9 prior to installation of the trim panel, showing details of the bracket on the HVAC housing in accordance with the first embodiment.
Figure 11:
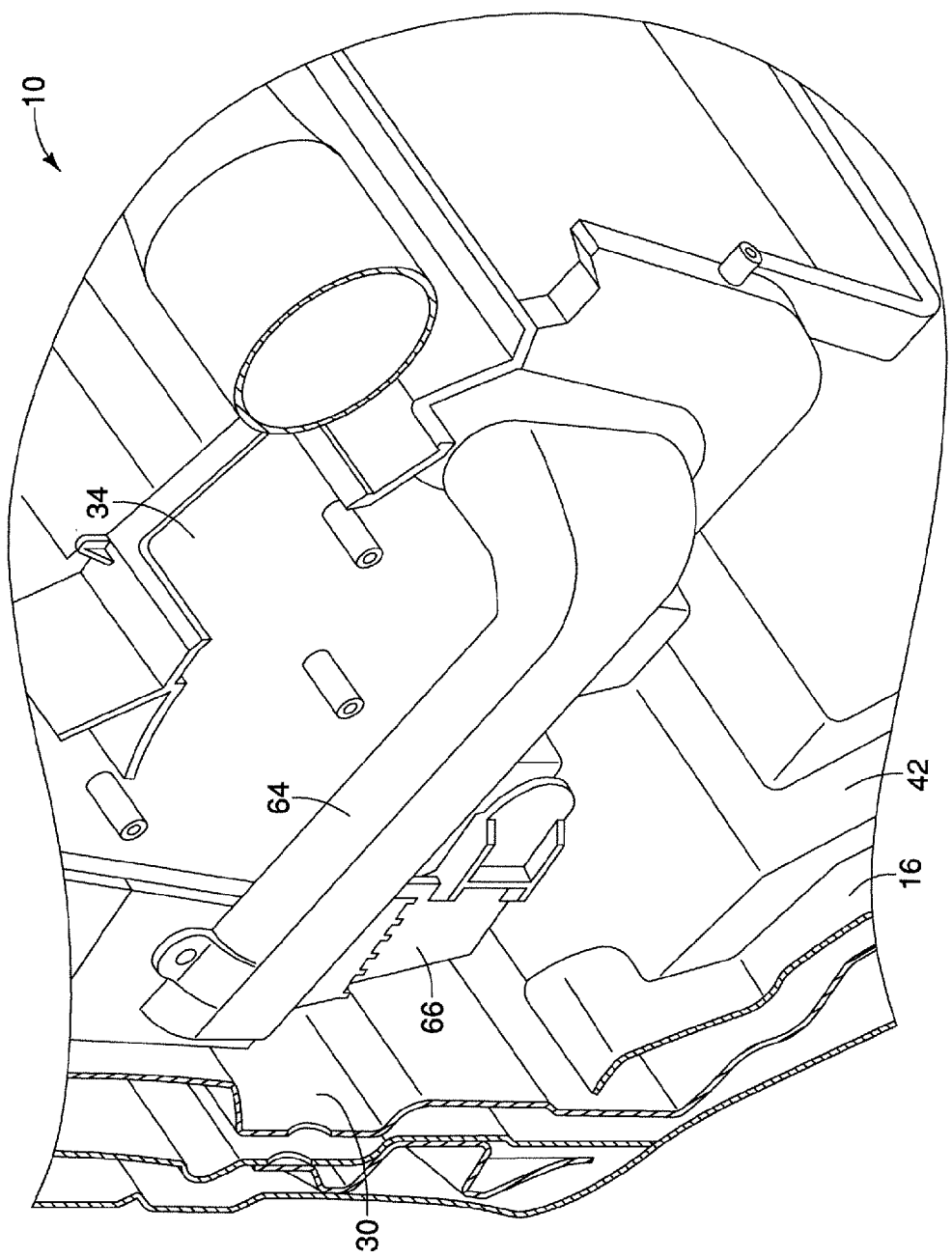
FIG. 11 is a perspective view of the portion of the passenger compartment depicted in FIGS. 7 and 9, showing further details of the bracket on the HVAC housing in accordance with the first embodiment.

A brief description of the HVAC housing 34 is now provided with specific reference to FIGS. 9, 10 and 11. The HVAC housing 34 is basically a conventional air handling enclosure that houses any of an air conditioning evaporator (not shown), a heater core (not shown), a blower motor (not shown) and/or air diverting doors (not shown) for controlling the flow of air in and out of the HVAC housing 34 and the passenger compartment of the vehicle 10. Since the air conditioning evaporator, the heater core, the blower motor and the air diverting doors are conventional elements of an HVAC system, further description is omitted for the sake of brevity.

In the depicted embodiment, the HVAC housing 34 engages the dash wall 30 and is rigidly attached to the cross-member 32 in a conventional manner. Alternatively, the HVAC housing 34 can be rigidly attached to one or both of the dashboard 18 and the dash wall 30.

The HVAC housing 34 also includes a cover member 64 and a bracket 66. The cover member 64 can be any of a variety of HVAC related elements, such as an air duct, a portion of the blower motor, coolant tube cover or engine coolant hose cover. In the depicted embodiment, the cover member 64 is a hose cover that protects a fluid pathway between the HVAC housing 34 and the engine compartment (not shown). The cover member 64 is fixed to an outer surface of the HVAC housing 34 by fasteners F.

In the depicted embodiment, the bracket 66 is fixed by one or more fasteners F (only one of the fasteners F is shown in FIGS. 9 and 10) to the cover member 64. Alternatively, one or more of the fasteners fixing the cover member 64 to the HVAC housing 34 can also fixedly attach the bracket 66 to the HVAC housing 34. In yet another alternative embodiment, the bracket 66 can be unitarily formed (e.g. molded together) with the cover member 64 and/or the HVAC housing as a single unitary monolithic element.

Figure 12:
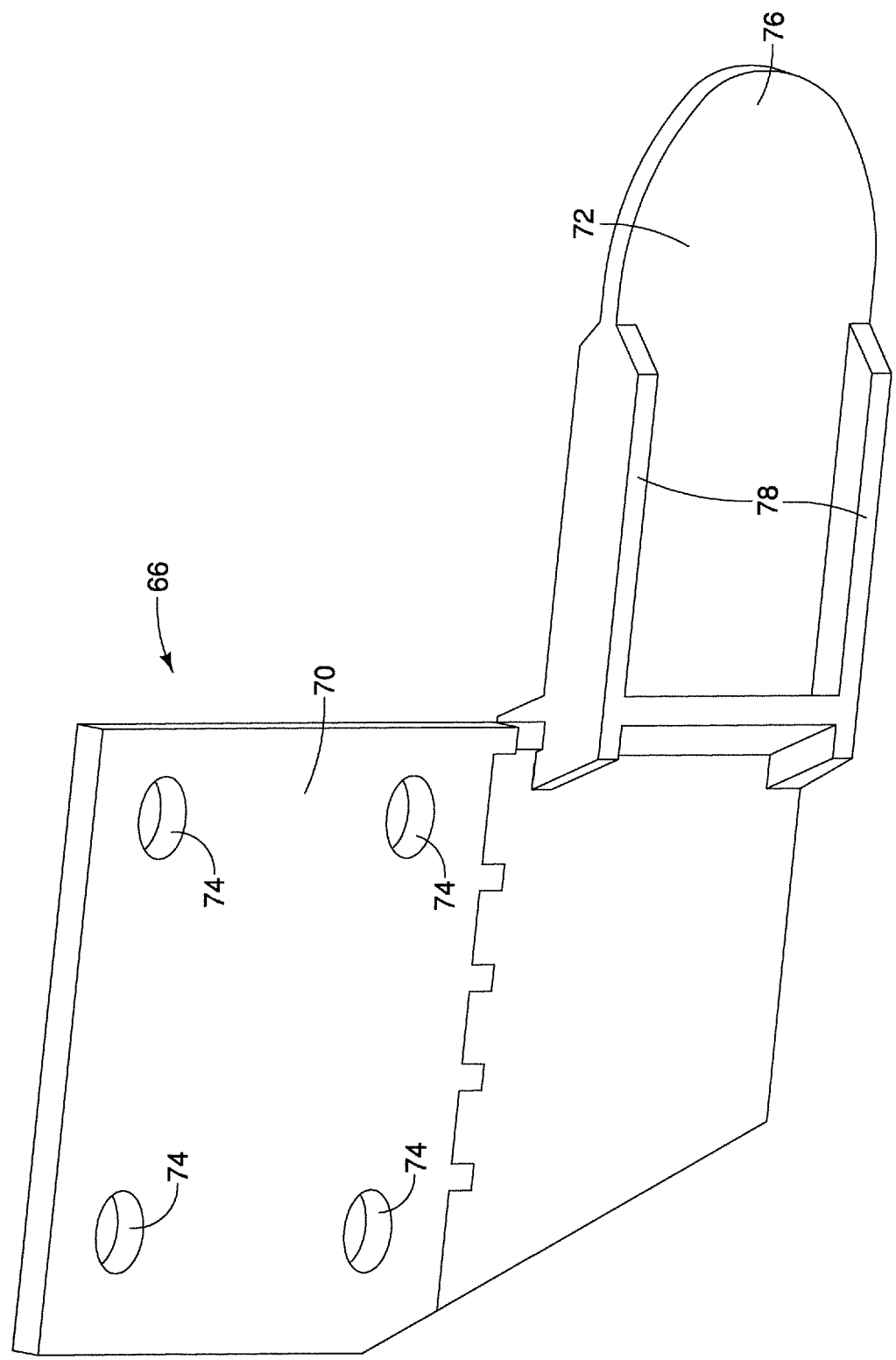
FIG. 12 is a perspective view of the bracket and the projection, shown removed from the HVAC housing in accordance with the first embodiment.

The bracket 66 can be made of any of a variety of plastic or polymer materials. As best shown in FIG. 12, the bracket 66 basically includes an attachment section 70 and a mounting projection 72. The bracket 66 is preferably made of a fairly rigid material that allows for some elastic deformation of the mounting projection 72, as is explained in greater detail below.

As shown in FIG. 12, the attachment section 70 and the mounting projection 72 of the bracket 66 form an L-shape when viewed from the side. As is indicated in FIGS. 12, 28 and 29, the mounting projection 72 is offset from the attachment section 70. In other words, the attachment section 70 lies in a first plane and the mounting projection 72 lies in a second plane that is approximately parallel to and spaced apart from the first plane.

Figure 13:
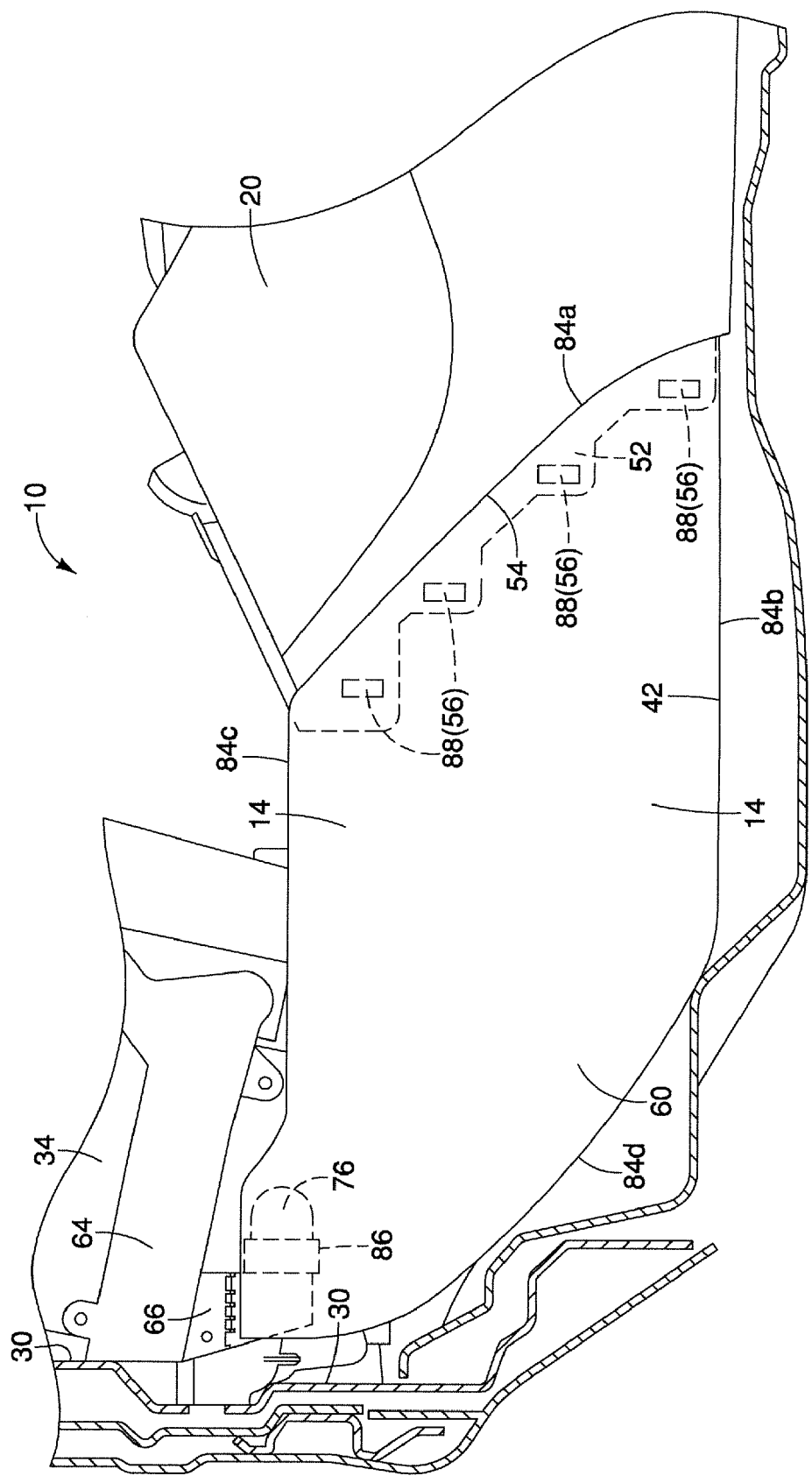
FIG. 13 is a cross-sectional side view of the passenger compartment, similar to FIG. 9, showing the trim panel installed to the bracket on the HVAC housing and the apertures in the center console in accordance with the first embodiment.

The attachment section 70 includes an upper area with fastener receiving apertures 74. Alternatively, one or more of the fastener receiving apertures 74 may be designed to accommodate a complimentary locating projection (not shown) on the cover member 64 and/or the HVAC housing 34. The mounting projection 72 includes a tongue 76 and ribs 78. The ribs 78 are provided to maintain a certain degree of rigidity along adjacent portions of the tongue 76. The distal end of the tongue 76 is rounded, having a semi-circular shape when viewed from the side, as shown in FIGS. 12 and 13. As is described below, the central portion of the tongue 76 can undergo small amounts of elastic deformation.

A description of the trim panel 14 is now provided with specific reference to FIGS. 14-21. The trim panel 14 (a vehicle trim panel) can be made of any of a variety of materials, such as plastic or polymer materials, composite materials, wood veneer, or any appropriate material that compliments and/or blends in with the decorative design of the vehicle 10, matching and/or complimenting the dashboard 18 and center console 20. The trim panel 14 basically includes a main body 80, the trim surface 60, a base surface 82 and a peripheral edge 84 that extends around the periphery of the main body 80, located and extending between the trim surface 60 and the base surface 82. Preferably, the trim surface 60 has a decorative contour and/or finish that matches and blends in with an outer surface finish of the center console 20. The base surface 82 includes a mounting structure 86 and a plurality of snap-fitting projections 88.

The mounting structure 86 includes a first support portion 90, a second support portion 92, a guide portion 94 and an overhang portion 96. The first support portion 90 and the second support portion 92 are spaced apart from one another. Both the first support portion 90 and the second support portion 92 extend from the base surface 82 to the guide portion 94. The mounting structure 86 is preferably unitarily formed with the trim panel 14. For example, if the trim panel 14 is manufactured using an injection mold process, the mounting structure 86 is formed unitarily as a monolithic structure with the main body 80 of the trim panel 14.

Figure 18:
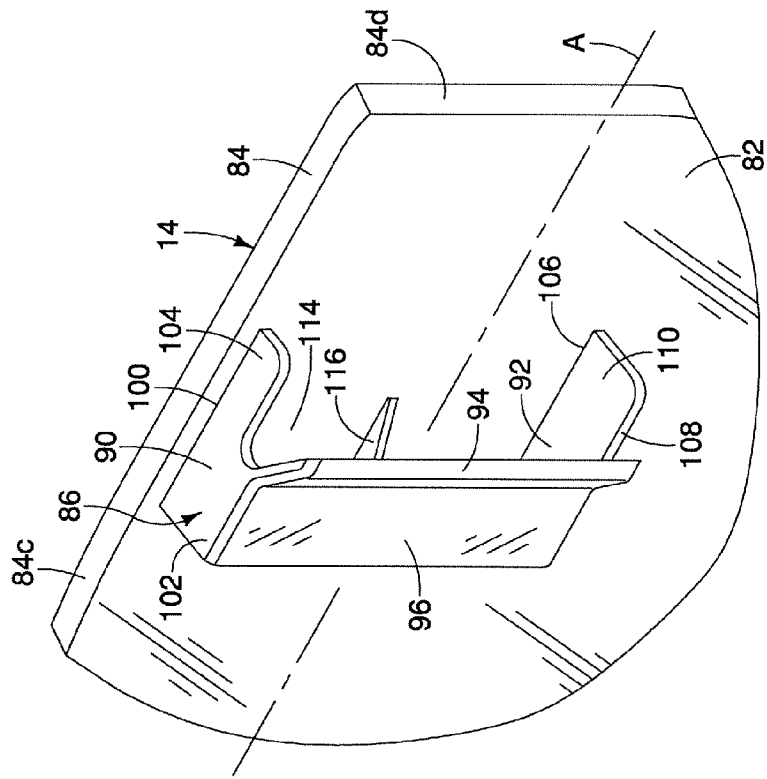
FIG. 18 is a perspective view of the trim panel showing further details of the mounting structure depicted in FIG. 17 including a deflection rib and a guide portion in accordance with the first embodiment.
Figure 17:
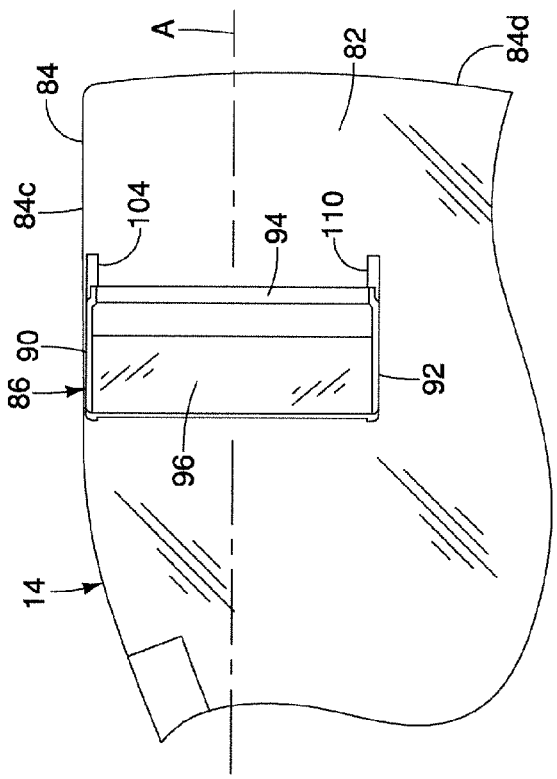
FIG. 17 is an enlarged elevational view of a portion of the base side of the trim panel showing details of the mounting structure of the trim panel in accordance with the first embodiment.
Figure 20:
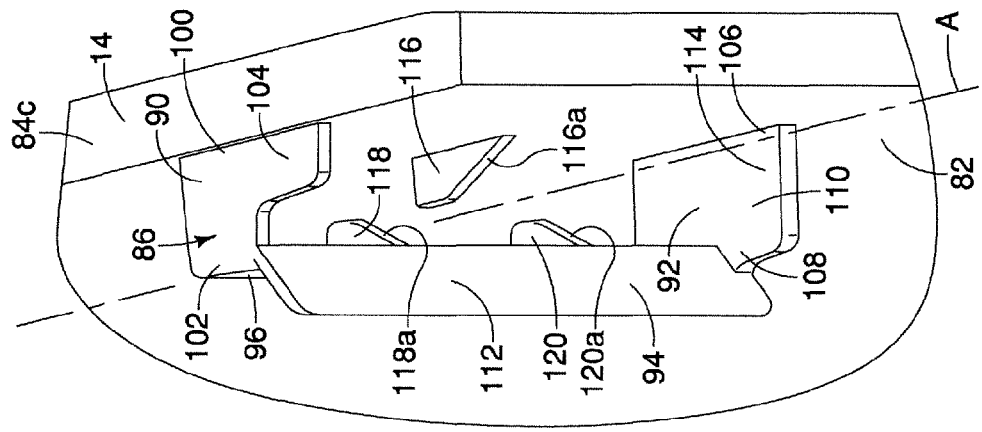
FIG. 20 is another perspective view of the trim panel from a slightly different angle than that depicted in FIG. 18 showing further details of the mounting structure including the deflection ribs and the guide portion in accordance with the first embodiment.
Figure 19:
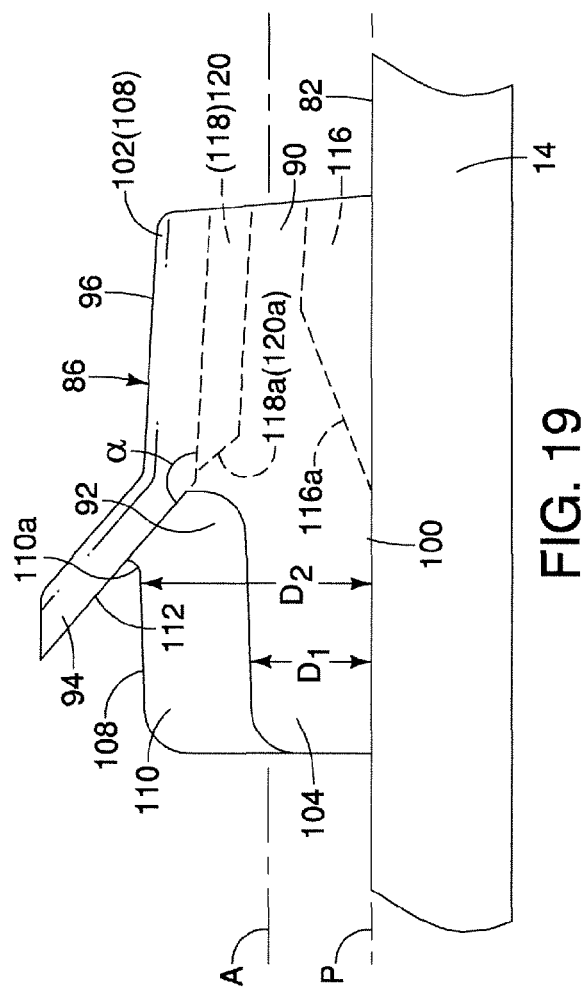
FIG. 19 is a plan view along a peripheral edge of the trim panel showing further details of the mounting structure depicted in FIGS. 17 and 18 including several deflection ribs and the guide portion in accordance with the first embodiment.
Figure 21:
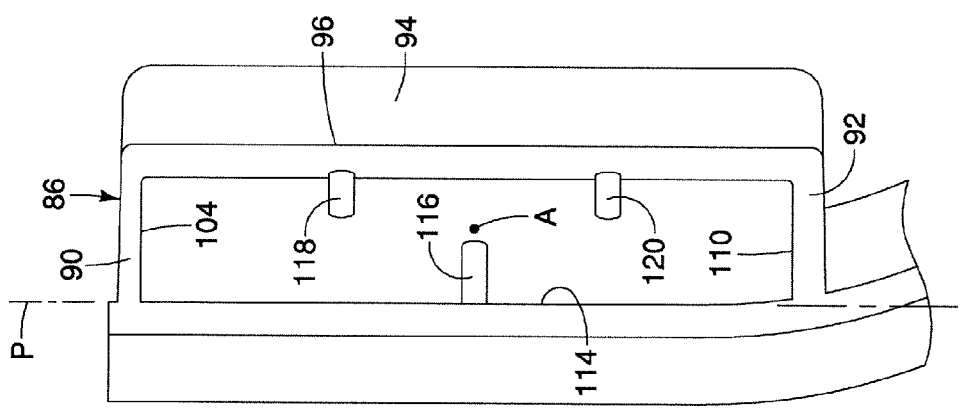
FIG. 21 is another end view of the trim panel showing further details of the mounting structure depicted in FIG. 19 including the deflection ribs and the guide portion in accordance with the first embodiment.

As best shown in FIGS. 18, 19 and 20, the first support portion 90 has a first end 100 fixedly attached to the base surface 82 and a second end 102 distal from the first end 100. A first side wall 104 extends from the first support portion 90 along the base surface 82, as best shown in FIGS. 17 and 21. It should be understood from the drawings and the description herein that the first support portion 90 is defined as a portion of the mounting structure 86 that extends from the base surface 82 to a lower side of the guide portion 94. The first side wall 104 is defined as a wall that extends along the base surface 82 away from the first support portion 90 and away from the guide portion 94.

Similarly, the second support portion 92 has a first end 106 fixedly attached to the base surface 82 and a second end 108 distal from the first end 106. A second side wall 110 extends from the second support portion 92 along the base surface 82. It should be understood from the drawings and the description herein that the second support portion 92 is defined as a portion of the mounting structure 86 that extends from the base surface 82 to a lower side of the guide portion 94. The second side wall 110 is defined as a wall that extends along the base surface 82 away from the second support portion 92 and away from the guide portion 94. As shown in FIG. 19, the guide portion 94 defines a guide surface 112 that is described in greater detail below.

Hence, both the first side wall 104 and the second side wall 110 are located between the overhang portion 96 and the base surface 82 of the trim panel 14. However, the first side wall 104 and the second side wall 110 do not have the same overall shape or profile, as best shown in FIG. 19. Specifically, the first side wall 104 is spaced further apart from the guide surface 112 of the guide portion 94. However, an end of the second side wall 110 adjacent to the second support portion 92 extends from the guide surface 112 to the base surface 82 parallel to the first side wall 104. Further, as best shown in FIG. 19, the first side wall 104 extends away from the base surface 82 of the trim panel a first distance $D_1$ and the second side wall 110 extends away from the base surface 82 of the trim panel 14 a second distance $D_2$ that is greater than the first distance $D_1$. Further, a distal edge 110a of the second side wall 110 relative to the base surface 82 of the trim panel 14 is aligned with the second end 108 of the second support portion 92.

The section of the base surface 82 that surround, is adjacent to and extends between the first and second support portions 90 and 92 is approximately planar. This section of the base surface defines a plane P, as indicated in FIGS. 19 and 21.

The first support portion 90 and the second support portion 92 are bridged by the guide portion 94 and the overhang portion 96. As best shown in FIGS. 20 and 21, the guide portion 94 extends between the second end 102 of the first support portion 90 and the second end 106 of the second support portion 92. As best shown in FIGS. 19 and 20, the overhang portion 96 extends away from the first support portion 90, the second support portion 92 and the guide portion 94. At least a section of the guide portion 94 defines a guide surface 112 that extends away from the base surface 82. More specifically, the guide surface 112 extends in a direction that is non-orthogonal relative to the plane P, as shown in FIG. 19. Further, the guide portion 94 extends away from the overhang portion 96 such that the intersection of the overhang portion 96 and the guide portion 94 defines an obtuse angle, as best indicated in FIG. 19. More specifically, the overhang portion 96 and the guide portion 94 define an angle $\alpha$ that is preferably between 130 and 150 degrees, and still more preferably between 135 and 145 degrees. Of course, the overhang portion 96 and the guide portion 94 can be arranged to form any other angle as needed and/or desired.

As best shown in FIGS. 18, 20, 21 and 28, the guide portion 94, the overhang portion 96, the first side wall 104 of the first support portion 90, the second side wall 110 of the second support portion 92 and the adjacent section of the base surface 82 define an insertion aperture 114 with a central axis A that extends parallel to the plane P. As best shown in FIG. 28, the insertion aperture 114 has a generally rectangular cross-section.

As is indicated in FIGS. 17, 18 and 21, both the first side wall 104 and the second side wall 110 extend along the base surface 82 parallel to the center axis A of the insertion aperture 112.

Within the insertion aperture 114, the mounting structure 86 includes first second and third deflection ribs 116, 118 and 120. More specifically, the first deflection rib 116 is formed on the base surface 82 such that the first deflection rib 116 extends away from the base surface 82, but is encircled by the first support portion 90, the second support portion 92 and the overhang portion 96. However, the first deflection rib 116 is spaced apart from the first support portion 90, the second support portion 92 and the overhang portion 96. Hence, the first deflection rib 116 is situated between the overhang portion 96 and the base surface 82 of the trim panel 14. The first deflection rib 116 also extends in a direction that is parallel to the center axis A of the insertion aperture 114. As is discussed in further detail below, the deflection rib 116 contacts tongue 76 of the bracket 66 when the mounting projection 72 is fully installed within the insertion apertures 114 of the mounting structure 86.

The second and third deflection ribs 118 and 120 are formed on an inner surface of the overhang portion 96. More specifically, the second and third deflection ribs 118 and 120 extend from the overhang portion 96 toward the base surface 82 within the insertion aperture 114. The second and third deflection ribs 118 and 120 extend in directions that are parallel to one another and parallel to the center axis A of the insertion aperture 114. The second and third deflection ribs 118 and 120 are formed at spaced apart locations such that the first deflection rib 116 is located between the second and third deflection ribs 118 and 120, as illustrated in FIGS. 20 and 21.

As indicated in FIGS. 19 and 20, the first deflection rib 116 includes a ramp surface 116a that is non-orthogonal relative to the plane P. Similarly, the second and third deflection ribs 118 and 120 include respective ramp surface 118a and 120a that are non-orthogonal relative to the plane P. The ramp surfaces 116a, 118a and 120a are all located at the end of the insertion aperture 114 that includes the guide surface 112, the first end wall 104 and the second end wall 110.

Figure 14:
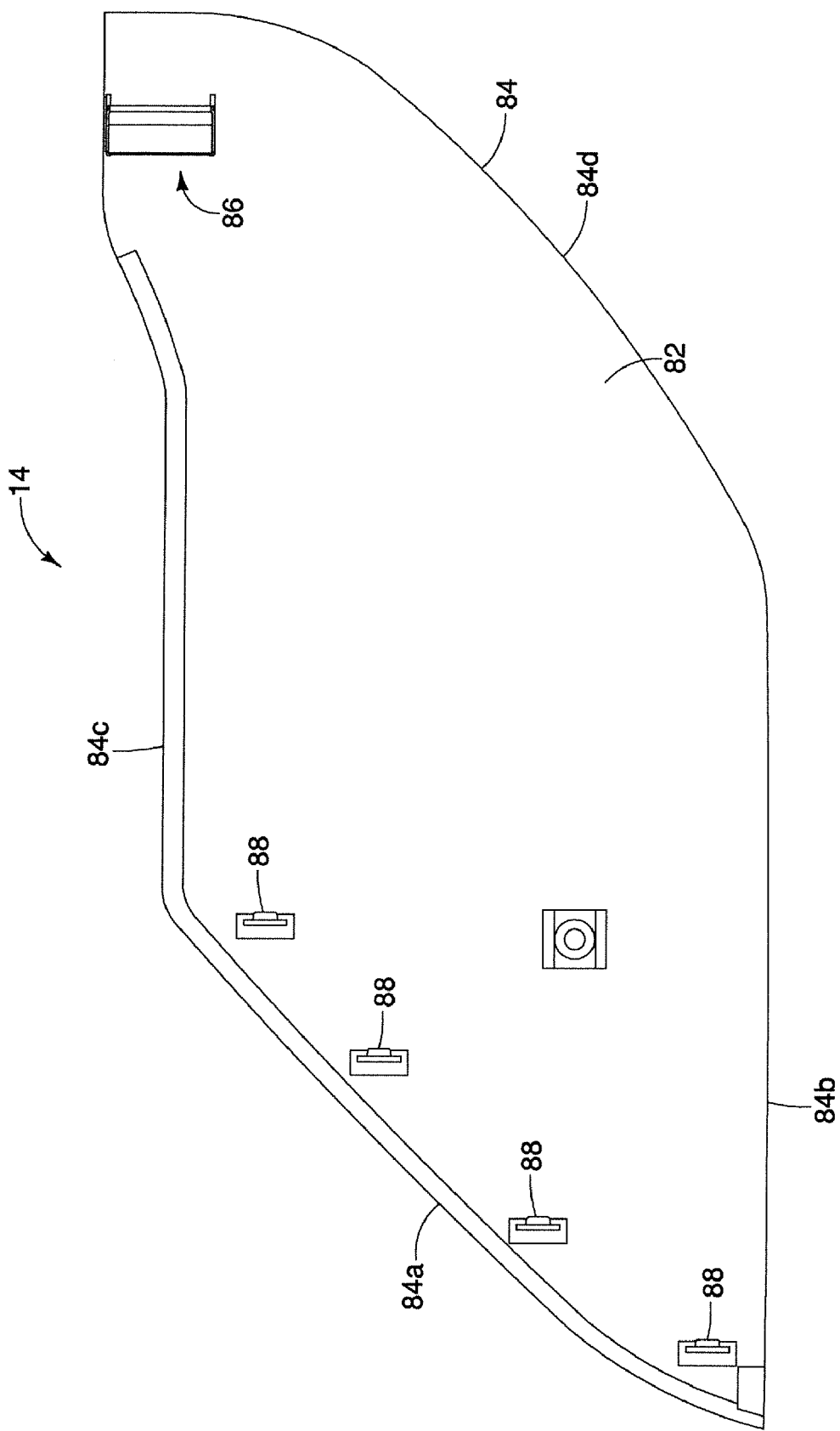
FIG. 14 is an elevational view of a hidden or base side of the trim panel shown removed from the center console and the HVAC housing showing a plurality of snap-fitting projections and a mounting structure in accordance with the first embodiment.
Figure 16:
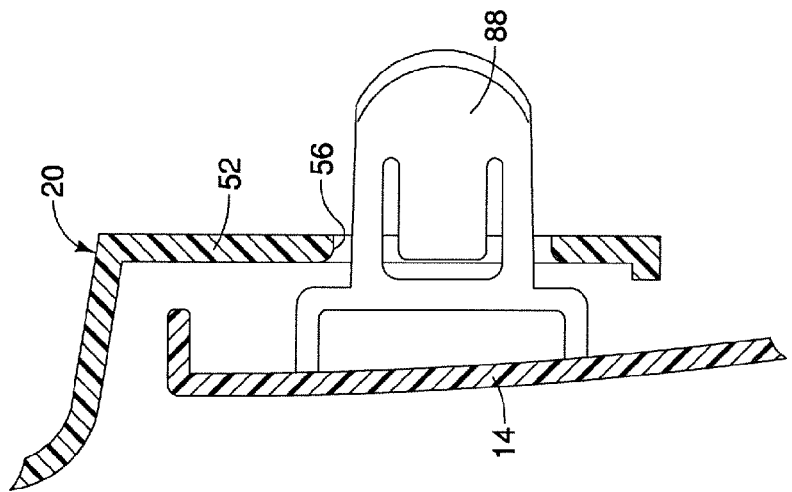
FIG. 16 is a side cross-sectional view of a portion of the trim panel and the center console showing one of the snap-fitting projections installed in one of the apertures of the center console in accordance with the first embodiment.
Figure 15:
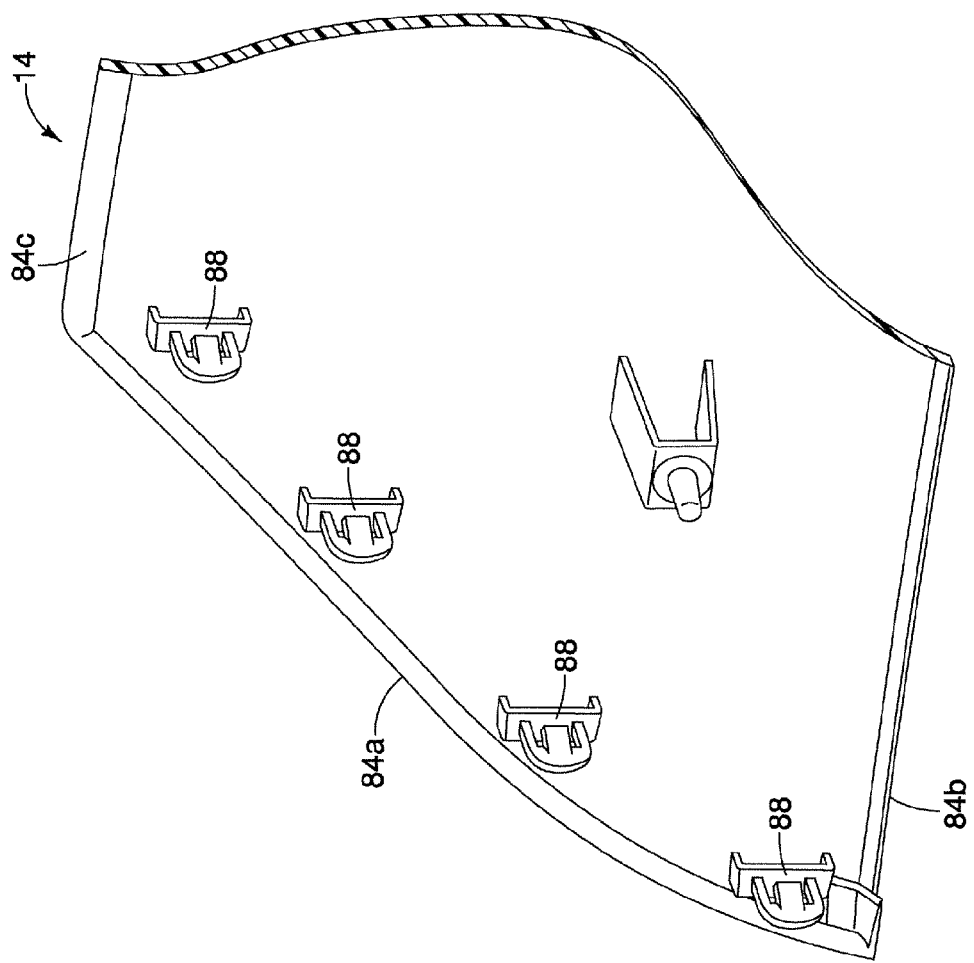
FIG. 15 is a perspective view of a portion of the base side of the trim panel showing details of the snap-fitting projections in accordance with the first embodiment.

A description of the peripheral edge 84 is now provided with initial reference to FIGS. 13 and 14. The peripheral edge 84 includes edge sections 84a, 84b, 84c and 84d. The edge section 84a is shaped and contoured to conform to the shape and contour of the forward lip 52 and the edge 54 of the center console 20. The edge section 84b is shaped and contoured to conform to the shape and contour of the forward surface section 42 of the floor 16 of the vehicle 10. The edge section 84c includes two parts that are both straight such that part of the edge section 84c conforms to an underside of the dashboard 18, as indicated in FIG. 8 and part of the edge section 84c corresponds to the location of the mounting structure 86. The edge section 84d is shaped and contoured to blend in with the shape and contour of the dash wall 30 such that any gap remaining between the trim panel 14 and the dash wall 30 is minimized.

As shown in FIG. 14, the mounting structure 86 is located adjacent to part of the edge section 84c of the peripheral edge 84 of the trim panel 14 but is spaced apart from the edge section 84d. As shown in FIG. 18, the first side wall 104 is situated closer to the edge section 84c of the peripheral edge 84 than the second side wall 110. Further, the first side wall 110 extends parallel to the edge section 84c of the peripheral edge 84 of the trim panel 14. As is indicated in FIG. 17, the edge section 84d extends in a direction perpendicular to the center axis A of the insertion aperture.

Figure 22:
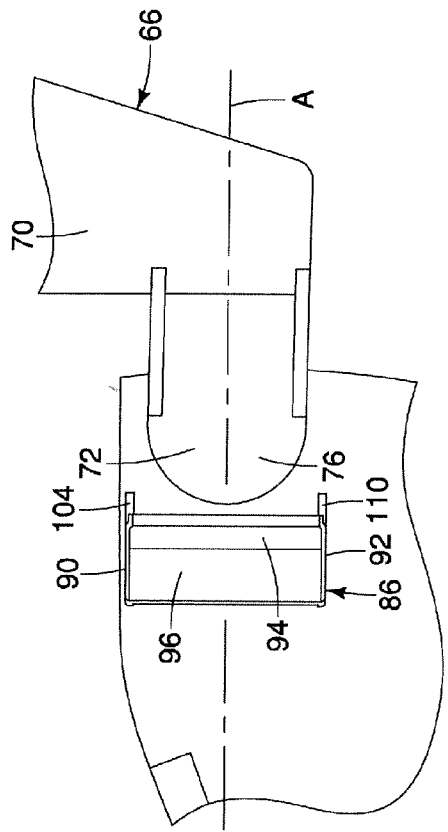
FIG. 22 is an elevational view of the mounting structure of the trim panel showing the projection of the bracket in the process of being installed to the mounting structure in accordance with the first embodiment.
Figure 24:
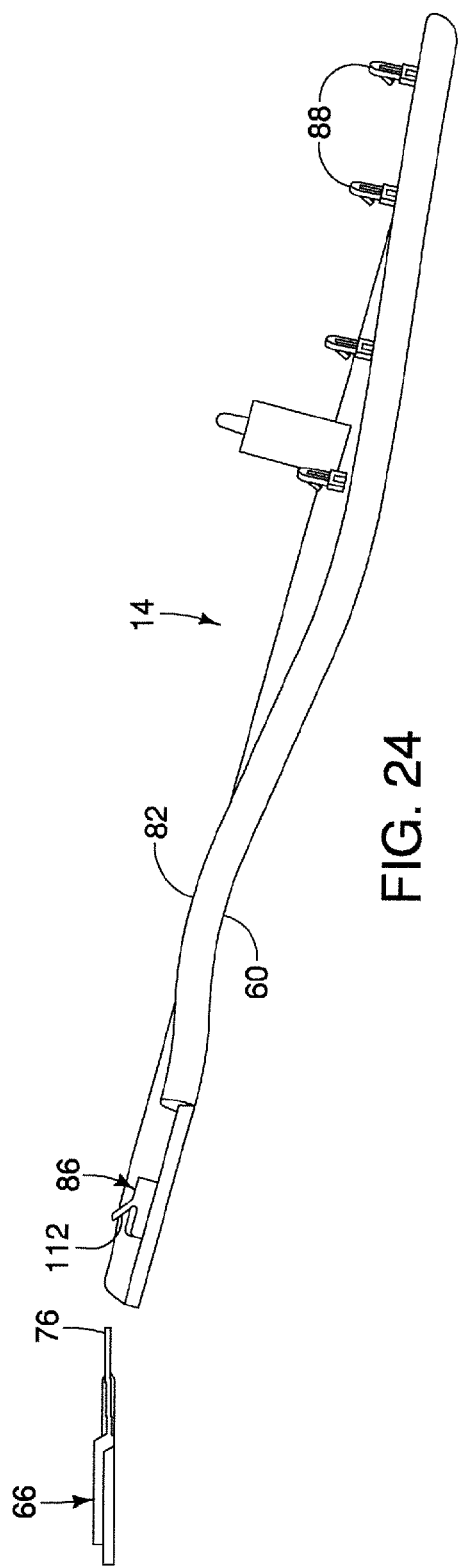
FIG. 24 is a top view looking downward at the projection of the bracket and the trim panel, showing the trim panel spaced apart from the bracket just prior to installation to the projection in accordance with the first embodiment.
Figure 25:
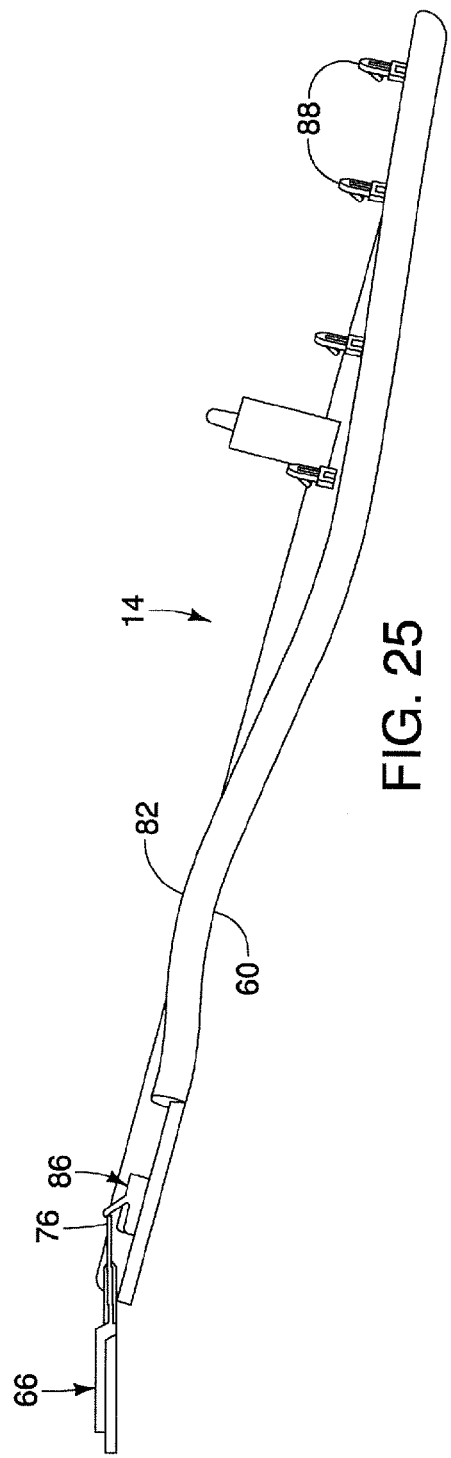
FIG. 25 is another top view of the projection of the bracket and the trim panel during blind installation of the trim panel, showing the guide portion of the mounting structure contacting the projection of the bracket during installation of the trim panel to the projection in accordance with the first embodiment.
Figure 26:
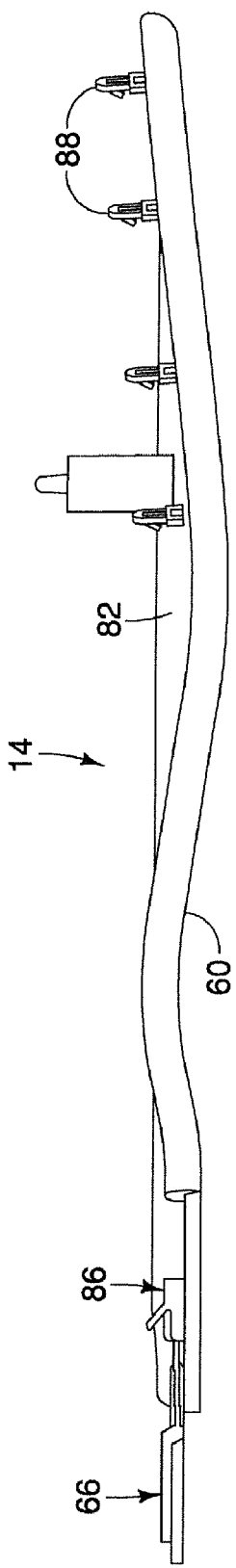
FIG. 26 is another top view of the projection of the bracket and the trim panel during blind installation of the trim panel, showing the projection partially extending into the guide portion of the mounting structure in accordance with the first embodiment.
Figure 27:
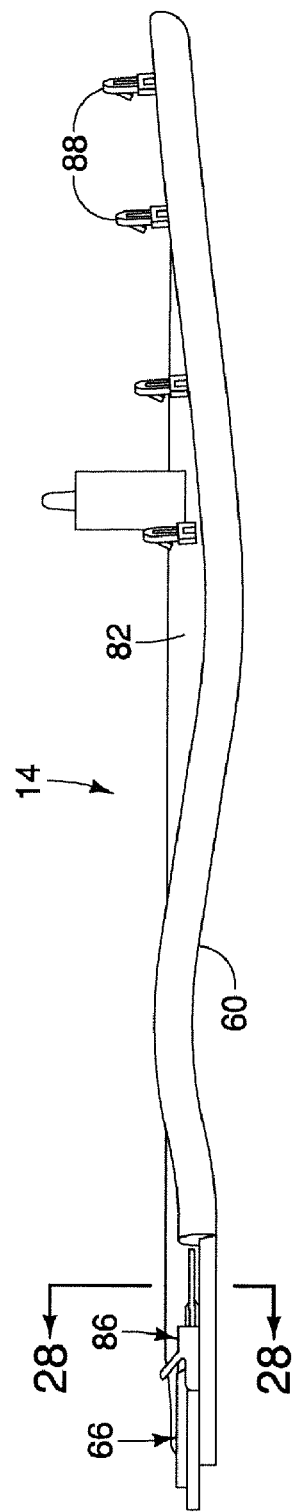
FIG. 27 is another top view of the projection of the bracket and the trim panel showing the projection installed into the guide portion of the mounting structure in accordance with the first embodiment.

As is best illustrated in FIGS. 24 thru 27, the trim panel 14 is installed to the vehicle trim assembly 12 in a process that is referred to as a blind installation. Specifically, in order to install the trim panel 14 to the bracket 66, the bracket 66 is covered or concealed by the trim panel 14 such that the installer cannot see the connecting parts (the bracket 66 and the mounting structure 86) as they come together. As such, this type of assembly procedure is termed a blind installation. As the trim panel 14 is installed to the vehicle trim assembly 12, mounting structure 86 is brought into position near the bracket 66, as shown in FIGS. 22 and 24. Since the mounting structure 86 is spaced apart from the edge section 84d, the installer is unable to simply bring a particular point along the edge section 84d into contact with the tongue 76 of the bracket 66. Therefore, the edge section 84d of the trim panel 14 is then slid along to the bracket 66 until the guide surface 112 contacts the tongue 76 of the bracket 66, as shown in FIG. 25. Thereafter, the trim panel 14 can be pushed such that the tongue 76 is guided into the insertion aperture 114, as indicated in FIG. 26. The trim panel 14 is then pushed forward causing the tongue 76 to be fully inserted into the insertion aperture 114, as indicated in FIG. 27.

In other words, once the tongue 76 contacts the guide surface 112, the trim panel 14 can be manipulated to push the tongue 76 into the insertion aperture 114. With the mounting structure 86 being spaced apart from the edge 84d, this installation procedure would otherwise be more difficult and/or time consuming. As is further illustrated in FIG. 22, once the tongue 76 contacts the guide surface 112, the tongue 76 can contact one or both of the first side wall 104 and the second side wall 110. Since the distal end of the tongue 76 is rounded, interaction between any of the first side wall 104, the second side wall 110 and the guide surface 112, assists in directing the tongue 76 into the insertion aperture 114.

Hence, the tongue 76 of the mounting projection 72 is guided toward the insertion aperture 114, with the guide surface 112, the first side wall 104 and the second side wall 110 working together to direct the tongue 76 of the mounting projection 72 into the insertion aperture 114. Thereafter, connection between the tongue 76 of the mounting projection 72 and the mounting structure 86 is assured thus securing the trim panel 14 to the HVAC housing 34 (a vehicle component).

Figure 23:
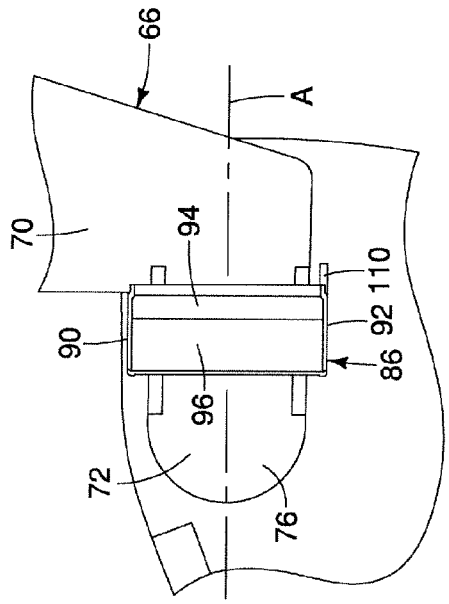
FIG. 23 is an elevational view of the mounting structure of the trim panel showing the projection of the bracket installed to the mounting structure in accordance with the first embodiment.

To account for manufacturing tolerances, the position of the tongue 76 relative to the mounting structure 86 can be manipulated until the snap-fitting projection 88 are positioned for insertion into the apertures 56 of the center console 20, as indicated in FIG. 13. More specifically, as indicated in FIG. 23 and more clearly shown in FIG. 28, the tongue 76 of the bracket 66 has an overall cross-sectional profile that is smaller than the overall dimensions of the insertion aperture 114. Therefore, the installed positioning of the tongue 76 within the mounting structure 86 is variable to account for manufacturing tolerances. In other words, the position of the tongue 76 within the insertion aperture 114 can be changed with a small amount of manual force or manipulation once the tongue 76 is disposed within the insertion aperture 114. Thus, only the positioning relationship between the snap-fitting projections 88 and the apertures 56 of the center console 20 need be fixed and less flexible.

As shown in FIG. 28, the first deflection rib 116, the second deflection rib 118 and the third deflection rib 120 each contact the tongue 76 of the mounting projection 72. More specifically, during insertion of the tongue 76 into the insertion aperture 114, the tongue 76 contact the ramp surface 116a of the first deflection rib 116, the ramp surface 118a of the second deflection rib 118 and the ramp surface 120a of the third deflection rib 120. Once contact is made between the tongue 76 and the ramp surfaces 116a, 118a and 120a, an increased amount of force is required to complete insertion of the tongue 76 into the insertion aperture 114, as explained below.

As is also shown in FIG. 28, contact between the tongue 76 and the first deflection rib 116, the second deflection rib 118 and the third deflection rib 120, causes the tongue 76 to undergo slight elastic deformation. In an uninstalled state, the tongue 76 is generally flat with planar opposing surfaces. The elastic deformation of the tongue 76 indicated in FIG. 28 demonstrates a level of force applied by the first deflection rib 116, the second deflection rib 118 and the third deflection rib 120 on the tongue 76. As discussed above, the tongue 76 and the trim panel 14 are made of materials that allow for slight amounts of elastic deformation. Therefore, the increased amount of force necessary to move the tongue 76 through the insertion aperture 114 is not enough to damage the trim panel 14 or the tongue 76, but is sufficient to hold the trim panel 14 is position once fully installed. Further, the force imparted to the tongue 76 by contact with the first deflection rib 116, the second deflection rib 118 and the third deflection rib 120 is so that the position of the trim panel 14 relative to the tongue 76 can be adjusted such that the snap-fitting projections 88 can be brought into final alignment with the apertures 56 of the center console 20. Alternatively, the tongue 76 can be molded in such a manner that the overall cross-sectional shape illustrated in FIG. 28 is achieved. For example, such a molded shape could still ensure sufficient rigidity of the vehicle trim assembly 12.

It should be understood from the drawings and the description herein that the ribs 78 of the mounting projection 72 provide additional rigidity to the tongue 76 such that during installation, a distal end portion of the tongue 76 had greater flexibility for easy installation that that portion of the tongue 76 that includes the ribs 78. Thus, blind installation of the trim panel 14 to the bracket 66 is easily accomplished with reliable, but flexible positioning of the trim panel 14 relative to the bracket 66.

Further, since the tongue 76 of the bracket 66 has an overall cross-sectional profile that is smaller than the overall size of the insertion aperture 114, the range of movement possible during installation of the trim panel 14 to the bracket 66 makes final positioning of the trim panel 14 flexible and reliable.

The vehicle 10 includes many conventional components that are well known in the art. Since these conventional components are well known in the art, these structures will not be discussed or illustrated in detail herein. Rather, it will be apparent to those skilled in the art from this disclosure that the components can be any type of structure that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle trim assembly. Accordingly, these terms, as utilized to describe the present invention should be interpreted relative to a vehicle equipped with the vehicle trim assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle trim panel, comprising
a main body having a trim surface and a base surface, with a peripheral edge extending between the trim surface and the base surface; and
a mounting structure fixed to the base surface of the main body, with the mounting structure including a first support portion and a second support portion spaced apart from one another, the first and second support portions both extending from the base surface, the first and second support portions having respective first ends fixedly attached to the base surface and the first and second support portions having respective second ends distal from the respective first ends, and
the first support portion and the second support portion being bridged by a guide portion that extends between the second ends of the first and second support portions, at least a section of the guide portion defining a guide surface that extends away from the base surface in a direction that is non-orthogonal relative to a plane defined by an adjacent section of the base surface, with the guide portion, the first support portion, the second support portion and the adjacent section of the base surface defining an insertion aperture with a central axis that extends parallel to the plane.

2. The vehicle trim panel according to claim 1, wherein the guide portion includes an overhang portion that extends away from the first and second support portions such that the overhang portion and the guide portion meet to form an obtuse angle.

3. The vehicle trim panel according to claim 2, wherein the mounting structure further includes a side wall that is located between the overhang portion and the base surface of the trim panel.

4. The vehicle trim panel according to claim 1, wherein the mounting structure further includes a side wall that extends along the base surface of the trim panel and parallel to a center axis of the insertion aperture.

5. The vehicle trim panel according to claim 4, wherein at least a portion of the side wall extends between the guide surface of the guide portion and the base surface.

6. The vehicle trim panel according to claim 4, wherein a distal edge of the side wall relative to the base surface of the trim panel is aligned with at least one of the first and second support portions.

7. The vehicle trim panel according to claim 1, wherein the mounting structure further includes first and second side walls that extend away from respective ones of the first and second support portions along the base surface of the trim panel and parallel to the center axis of the insertion aperture.

8. The vehicle trim panel according to claim 7, wherein the first side wall extends away from the base surface of the trim panel a first distance and the second side wall extends away from the base surface of the trim panel a second distance that is greater than the first distance.

9. The vehicle trim panel according to claim 1, wherein the mounting structure is located adjacent to a section of the peripheral edge of the trim panel.

10. The vehicle trim panel according to claim 7, wherein the first side wall is situated closer to the peripheral edge of the trim panel than the second side wall.

11. The vehicle trim panel according to claim 9, wherein the first side wall extends parallel to the section of the peripheral edge of the trim panel.

12. The vehicle trim panel according to claim 1, wherein the peripheral edge of the trim panel includes a straight section that extends in a direction perpendicular to the center axis of the insertion aperture, and the mounting structure is spaced apart from the straight section of the peripheral edge of the trim panel.

13. The vehicle trim panel according to claim 1, wherein one end of the insertion aperture has an overall rectangular cross-section.

14. The vehicle trim panel according to claim 1, wherein the mounting structure includes a deflection rib positioned between the guide portion and the adjacent section of the base surface of the trim panel, the deflection rib extending in a direction that is parallel to the center axis of the insertion aperture.

15. The vehicle trim panel according to claim 14, wherein the deflection rib includes a ramp surface that is non-orthogonal relative to the plane defined by the adjacent section of the base surface.

16. The vehicle trim panel according to claim 14, wherein the deflection rib extends along the base surface of the trim panel.

17. The vehicle trim panel according to claim 1, wherein the mounting structure further includes first and second deflection ribs positioned between the guide portion and the base surface of the trim panel that extend parallel to the center axis of the insertion aperture, with the first deflection rib contacting the guide portion and the second deflection rib extending along the base surface.

18. A vehicle trim assembly, comprising
a vehicle component including mounting projection that extends from the vehicle component; and
a vehicle trim panel having a main body and a mounting structure, the main body including a trim surface, a base surface and a peripheral edge extending between the trim surface and the base surface, the mounting structure fixed to the base surface, the mounting structure including a first support portion and a second support portion spaced apart from one another, the first support portion and the second support portion being bridged by a guide portion that extends between distal ends of the first and second support portions relative to the base surface, at least a section of the guide portion defining a guide surface that extends away from the base surface in a direction that is non-orthogonal relative to a plane defined by an adjacent section of the base surface, the guide portion, the first support portion, the second support portion and the adjacent section of the base surface defining an insertion aperture with a central axis that extends parallel to the plane,
wherein the vehicle trim assembly is configured to guide the mounting projection along the guide surface and into the insertion aperture upon insertion of the mounting projection into the insertion aperture, with engagement of the mounting projection with the mounting structure securing the vehicle trim panel to the vehicle component.

19. The vehicle trim assembly according to claim 18, wherein
the mounting structure further includes at least one deflection rib positioned between the guide portion and the base surface of the trim panel that extends parallel to the center axis of the insertion aperture, the at least one deflection rib contacting the mounting projection with the mounting projection in full engagement with the mounting structure.

20. The vehicle trim assembly according to claim 18, wherein
the mounting structure further includes at least one side wall that extends away from one of the first and second support portions along the base surface of the trim panel and parallel to the center axis of the insertion aperture, the at least one side wall being dimensioned to guide the mounting projection into the insertion aperture upon insertion of the mounting projection into the insertion aperture.

* * * * *